United States Patent Office 3,126,390
Patented Mar. 24, 1964

3,126,390
18-EPI-DESERPIDATES AND DERIVATIVES
Michael Mullen Robison, Berkeley Heights, and Robert Armistead Lucas, Mendham, N.J., assignors to Ciba Corporation, a corporation of Delaware
No Drawing. Filed Sept. 22, 1961, Ser. No. 139,896
21 Claims. (Cl. 260—287)

The present invention concerns a 3-epi-allo-yohimbane compounds having the nucleus of the formula:

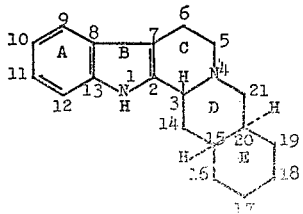

More particularly, it relates to 18α-hydroxy-3-epi-allo-yohimbane 16β-carboxylic acid esters, especially 18α-hydroxy-17α-R-3-epi-allo-yohimbane 16β-carboxylic acid esters, in which R represents primarily lower alkoxy, as well as cyano, salts, N-oxides or salts of N-oxides thereof. Apart from the groups attached to the 16β-position, the 17-position and the 18α-position, the compounds of the present invention may have additional substituents. Thus, substituents attached to the positions of the aromatic nucleus, i.e. ring A, of the molecule, more specifically to the 9-position, the 10-position, the 11-position and/or the 12-position, are represented, for example, by aliphatic hydrocarbon, such as lower alkyl and the like, etherified hydroxyl, particularly lower alkoxy, as well as cycloalkyloxy, cycloalkyl-lower alkoxy, carbocyclic aryloxy, carbocyclic aryl-lower alkoxy, lower alkylenedioxy and the like, esterified hydroxyl, particularly halogeno, as well as lower alkoxy-carbonyloxy, lower alkanoyloxy and the like, etherified mercapto, such as lower alkylmercapto and the like, nitro, amino, such as N,N-disubstituted amino and the like, substituted aliphatic hydrocarbon, such as substituted lower alkyl, for example, halogeno-lower alkyl, particularly trifluoromethyl, or any other suitable substituent. Other substituents, such as aliphatic hydrocarbon radicals, such as lower alkyl, may also be attached to positions of other nuclei, particularly of the heterocyclic nucleus C, more specifically to the 5-position and/or the 6-position.

More especially, the invention is directed to the compounds of the formula:

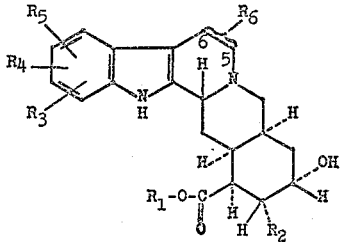

in which $R_1$ represents an aliphatic radical, primarily lower alkyl, as well as a substituted aliphatic radical, primarily substituted lower alkyl such as for example monocyclic carbocyclic, aryl-lower alkyl, e.g. phenyl-lower alkyl and the like, etherified hydroxy-lower alkyl, e.g. lower alkoxy-lower alkyl and the like, tertiary amino-lower alkyl, e.g. N,N-di-lower alkylamino-lower alkyl and the like, $R_2$ stands primarily for lower alkoxy, as well as for cyano, each of the groups $R_3$, $R_4$ and $R_5$ stands for hydrogen, aliphatic hydrocarbon, particularly lower alkyl and the like, substituted aliphatic hydrocarbon, particularly substituted lower alkyl, such as trifluoromethyl, etherified hydroxyl, particularly lower alkoxy, as well as cycloalkyloxy, cycloalkyl-lower alkoxy, carbocyclic aryloxy, carbocyclic aryl-lower alkoxy or any other analogous etherified hydroxyl group, esterified hydroxy, particularly halogeno, as well as lower alkoxy-carbonyloxy, lower alkanoyloxy and the like, etherified mercapto, particularly lower alkyl-mercapto, nitro, amino, such as N,N-di-substituted amino and the like, or whenever two of the groups $R_4$, $R_5$ and $R_6$ are attached to two adjacent positions and are taken together, for lower alkylenedioxy, and $R_6$, attached to one of the positions 5 and 6, stands for hydrogen or lower alkyl, salts, N-oxides or salts of N-oxides of such compounds, as well as process for the preparation of such compounds.

The aliphatic radical of the alcohol portion of the ester grouping attached to the 16β-position of the molecule, which, in the above formula, is represented by the group $R_1$, stands above all for lower alkyl having from one to ten, preferably from one to four, carbon atoms; such groups are particularly methyl, ethyl, n-propyl, isopropyl, n-butyl, isobutyl, secondary butyl and the like, as well as n-pentyl, isopentyl, n-hexyl, n-heptyl and the like.

The esterifying portion of the ester grouping attached to the 16β-position of the molecule, and represented, for example, by the radical $R_1$ in the above formula, may also stand for a substituted aliphatic, particularly a substituted lower alkyl, radical, such as, for example, monocyclic carbocyclic aryl-lower alkyl, in which lower alkyl has from one to four carbon atoms, such as phenyl-lower alkyl, e.g. benzyl, 1-phenyl-ethyl, 2-phenyl-ethyl and the like, or phenyl-lower alkyl, in which phenyl is substituted by lower alkyl, e.g. methyl, ethyl and the like, lower alkoxy, e.g. methoxy, ethoxy and the like, halogeno, e.g. fluoro, chloro, bromo and the like, or any other suitable substituent.

Other substituted aliphatic, particularly lower alkyl, radicals, as represented, for example, by the group $R_1$ in the above formula, are aliphatic, especially lower alkyl, radicals substituted by functional groups, such as etherified hydroxyl, particularly lower alkoxy having preferably from one to four carbon atoms, e.g. methoxy, ethoxy, n-propyloxy, isopropyloxy, n-butyloxy and the like, tertiary amino, particularly N,N-di-lower alkyl-amino, in which lower alkyl has from one to four carbon atoms, e.g. N,N-dimethylamino, N-ethyl-N-methylamino, N,N-diethylamino, N,N,-di-n-propylamino, N,N,-di-isopropylamino and the like, as well as 1-N,N,-alkylene-imino, in which alkylene has from four to six ring carbon atoms, e.g. 1-pyrrolidino, 1-piperidino, 1-N,N-hexamethylene-imino and the like, 1-N,N-oxa-alkyleneimino, in which oxa-alkylene has preferably four ring carbon atoms, e.g. 4-morpholino and the like, N,N-thia-alkylene-imino, in which alkylene has preferably four carbon atoms, e.g. 4-thiamorpholino and the like, or 1-N,N-aza-alkylene-imino, in which aza-alkylene has from four to six ring carbon atoms, particularly 4-lower alkyl-1-piperazino, e.g. 4-methyl-1-piperazino, 4-ethyl-1-piperazino, and the like. The aliphatic, particularly the lower alkyl, portion in an aliphatic, especially a lower alkyl, radical substituted by a functional group, such as in an etherified hydroxy-lower alkyl or in a tertiary amino-lower alkyl radical and the like, may be represented by a lower alkylene radical, which has at least two, preferably from two to three, carbon atoms, separating the functional group, such as etherified hydroxy, tertiary amino and the like, from the 16β-carboxyl group, which it esterifies, by at least two, preferably by from two to three, carbon atoms. Such alkylene radicals are primarily 1,2-ethylene, 1-methyl-1,2-ethylene, 2-methyl-1,2-ethylene, 1,3-propylene, as well as 1,4-butylene and the like. Aliphatic, particularly lower alkyl, radicals, which are substituted by functional groups, and are represented, for example, by $R_1$ in the above formula, may be primarily lower alkoxy-lower alkyl, in which lower alkyl has from two to three carbon atoms and separates the lower alkoxy group from the 16β-carboxyl group in the molecule by at least two carbon atoms, for example, 2-lower alkoxy-ethyl, e.g. 2-methoxy-ethyl, 2-ethoxyethyl and the like, 2-lower alkoxy-propyl, e.g. 2-methoxy-propyl and the like, 3-lower alkoxy-propyl, e.g. methoxy-propyl, 3-ethoxy-propyl and the like. Other substituted aliphatic, particularly lower alkyl, radicals, are, for example, N,N-di-lower alkyl-amino-lower alkyl, in which lower alkyl carrying the N,N-di-lower alkyl-amino group has from two to three carbon atoms and separates the N,N-di-lower alkyl-amino group from the 16β-carboxyl group in the molecule by at least two carbon atoms, for example, 2-N,N-di-lower alkyl-amino-ethyl, e.g. 2-N,N-dimethylaminoethyl, 2-N,N-diethylaminoethyl and the like, 2-N,N-di-lower alkyl-amino-propyl, e.g. 2-N,N-diethylaminopropyl and the like, 3-N,N-di-lower alkylaminopropyl, e.g. 3-N,N-dimethyl-aminopropyl, 3-N,N-diethylaminopropyl and the like, N,N-alkylene-imino-lower alkyl, in which lower alkyl has from two to three carbon atoms and separates the N,N-alkylene-imino group from the 16β-carboxyl group in the molecule by at least two carbon atoms, and alkylene has from four to seven carbon atoms, such as 2-(1-N,N-alkyl-ene-imino)-ethyl, e.g. 2-(1-pyrrolidino)-ethyl, 2-(1-piperidino)-ethyl and the like, 2-(N,N-alkylene-imino)-propyl, e.g. 2-(1-piperidino)-propyl and the like, 3-(1-N,N-alkylene-imino)-propyl, e.g. 3-(1-piperidino)-propyl, 3-(1-N,N-hexamethylene-imino)-propyl and the like, or any other suitable tertiary amino-lower alkyl radical.

The substituent attached to the 17α-position, as represented by the group $R_2$ in the above formula, stands primarily for lower alkoxy which has preferably from one to four carbon atoms, and is primarily methoxy, as well as ethoxy, n-propyloxy, isopropyloxy, n-butyloxy, isobutyloxy and the like. It may also represent cyano.

Substituents attached to any of the positions available for substitution in ring A, particularly those represented by the groups $R_3$, $R_4$ and $R_5$ (each of which may also stand for hydrogen) in the previously-given formula, may be, for example, lower aliphatic hydrocarbon, especially lower alkyl, having preferably from one to four carbon atoms, e.g. methyl, ethyl, n-propyl, isopropyl, n-butyl, isobutyl, secondary butyl, tertiary butyl and the like, or functional groups, such as, for example, etherified hydroxyl, particularly lower alkoxy, having preferably from one to four carbon atoms, e.g. methoxy, ethoxy, n-propyloxy, isopropyloxy, n-butyloxy, isobutyloxy, secondary butyl-oxy, tertiary butyloxy and the like, as well as lower alkenyloxy, e.g. allyloxy and the like, cycloalkyloxy, in which cycloalkyl has from three to eight, preferably from five to six, ring carbon atoms, e.g. cyclopentylmethoxy, 2-cyclopentylethoxy, cyclohexylmethoxy and the like, carbocyclic aryloxy, such as monocyclic carbocyclic aryloxy, e.g. phenyloxy and the like, carbocyclic aryl-lower alkoxy, such as monocyclic carbocyclic aryl-lower alkoxy, for example, phenyl-lower alkoxy, e.g. benzyloxy, diphenyl-methoxy, 2-phenylethoxy and the like, esterified hydroxyl, particularly halogeno (representing hydroxyl esterified by a hydrohalic acid), particularly halogeno having an atomic weight of 19 to 80, e.g. fluoro, chloro, bromo and the like, as well as lower alkoxy-carbonyloxy, e.g. methoxycarbonyloxy, ethoxycarbonyloxy and the like, or lower alkanoyloxy, e.g. acetoxy, propionyloxy and the like, etherified mercapto, particularly lower alkyl-mercapto, having preferably from one to four carbon atoms, e.g. methylmercapto, ethylmercapto and the like, nitro, amino, particularly N,N-disubstituted amino, such as N,N-di-lower alkyl-amino, e.g. N,N-dimethylamino, N-ethyl-N-methylamino, N,N-diethylamino and the like, polyhalogeno-lower alkyl, particularly trifluoromethyl and the like, or any other suitable functional group. A substituent may also be attached to two adjacent positions of ring A and form a ring fused onto the A-ring; for example, two of the radicals $R_3$, $R_4$ and $R_5$ in the formula, when substituting two neighboring positions and taken together, may also form a fused-on cyclic substituent. Such substituent may be represented, for example, by lower alkylene-dioxy, e.g. methylenedioxy, 1,1-ethylenedioxy and the like, or any other analogous grouping.

Substituents, which may be attached to other positions in the molecule, particularly to positions in ring C available for substitution, are primarily aliphatic hydrocarbon, such as lower alkyl, having preferably from one to four carbon atoms, particularly methyl, as well as ethyl, n-propyl, isopropyl and the like. The radical $R_6$ in the previously-given formula, which stands primarily for hydrogen, may, therefore, also represent lower alkyl, particularly methyl, as well as ethyl and the like.

Salts of the compounds of this invention are acid addition salts, in case of pharmacologically active compounds, the pharmaceutically acceptable acid addition salts, particularly those with inorganic acids, e.g. hydrochloric, hydrobromic, sulfuric, phosphoric acid and the like, as well as with organic acids, e.g. acetic, maleic, citric, tartaric, methane sulfonic, p-toluene sulfonic acid and the like.

Also included within the scope of the present invention are the N-oxides of the above-described compounds, as well as the acid addition salts, in case of pharmacologically useful compounds, the pharmaceutically acceptable acid addition salts of these N-oxides, such as the addition salts with the above-mentioned inorganic and organic acids.

In view of the fact that several asymmetric carbon atoms are present in the compounds of this invention, the latter may be obtained in the form of a mixture of racemates, racemates or optically pure compounds.

The compounds of this invention are intermediates for the preparation of other valuable compounds. For example, upon acylation of the 18α-hydroxyl group, for example, according to the procedures to be described hereinbelow, the compounds of this invention may be converted into 18α-acyloxy-3-epi-allo-yohimbane 16β-carboxylic acid esters, in which acyl represents the acyl radical of an organic carboxylic acid or of an organic sulfonic acid, salts, N-oxides or salts of N-oxides thereof. Diesters of the above-mentioned type, in which acyl represents the acyl radical of an organic carboxylic acid, have pharmacologically useful effects; for example, they exhibit sedative and tranquilizing effects on the central nervous system, as well as antihypertensive properties and can be used, for example, as sedative and tranquilizing agents to relieve states of hyperactivity, tension and agitation, or as antihypertensive agents to relieve hypertensive conditions, such as, for example, benign or malignant hypertension, renal hypertension, toxemia of pregnancy and the like. Furthermore, they show antifibrillatory effects and are, therefore, suitable for the treatment of cardiac irregularities, including extrasystoles, circular fibrillation and the like.

Diesters of the above shown type, in which acyl stands for the acyl radical of an organic sulfonic acid, for example, of an aliphatic sulfonic acid, such as, a lower alkane sulfonic acid, e.g. methane sulfonic, ethane sulfonic acid and the like, or of a carbocyclic aryl sulfonic acid, particularly a monocyclic carbocyclic aryl sulfonic acid, such as benzene sulfonic acid, a halogeno-benzene sulfonic acid, e.g. 4-bromo-benzene sulfonic acid and the like, a nitro-benzene sulfonic acid, e.g. 3-nitro-benzene sulfonic, 4-nitro-benzene sulfonic acid and the like, or any other suitable sulfonic acid, may serve as important intermediates for the preparation of useful compounds. For example, upon treatment with an aliphatic alcohol, such as a lower alkanol, e.g. methanol, ethanol, n-propanol, isopropanol and the like, or a substituted aliphatic alcohol, such as a lower alkoxy-lower alkanol, e.g. 2-methoxyethanol and the like, if necessary, in the presence of a base, such as an organic amine, e.g. N,N,N-triethylamine and the like, 18β-etherified hydroxy-3-epi-allo-yohimbane 16β-carboxylic acid esters can be formed, for example, 18β-lower alkoxy-3-epi-allo-yohimbane 16β-carboxylic acid esters, or salts, N-oxides or salts of N-oxides of such compounds. These 18β-etherified hydroxy-3-epi-allo-yohimbane 16β-carboxylic acid ester compounds show pronounced sedative, tranquilizing, anti-hypertensive or antifibrillatory properties and can be used accordingly as pharmacologically active agents.

In addition, the 18α-hydroxy-3-epi-allo-yohimbane 16β-carboxylic acid ester compounds of this invention show themselves sedative and tranquilizing properties, as well as antifibrillatory effects and are, therefore, suitable as agents to cause sedation, as well as in the treatment of cardiac irregularities, including extrasystoles, circular fibrillation and the like.

Particularly useful are the compounds of the formula:

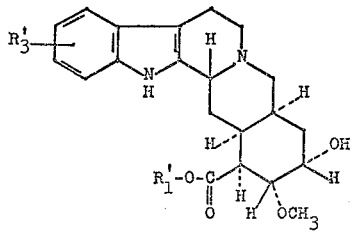

in which $R_1'$ represents lower alkyl, having preferably from one to four carbon atoms, e.g. methyl, ethyl, n-propyl, isopropyl, n-butyl, isobutyl, secondary butyl and the like, and $R_3'$ represents lower alkoxy, having from one to four carbon atoms, e.g. methoxy, ethoxy, n-propyloxy, isopropyloxy, n-butyloxy and the like, whereby $R_3'$ is preferably attached to the 10-position or the 11-position, or acid addition salts thereof.

These compounds are primarily represented by lower alkyl 18-epi-reserpates, in which lower alkyl has from one to four carbon atoms, e.g. methyl, ethyl, n-propyl, isopropyl, n-butyl, isobutyl and the like, or acid addition salts of such compounds with mineral acids, e.g. hydrochloric, hydrobromic, sulfuric, phosphoric acids and the like.

The 18α-hydroxy-3-epi-allo-yohimbane 16β-carboxylic acid esters, particularly those of the previously-given formula, salts, N-oxides or salts of N-oxides thereof, are prepared, for example, by treating an 18β-organic sulfonyloxy-3-epi-allo-yohimbane 16β-carboxylic acid ester, a salt, an N-oxide or a salt of an N-oxide thereof, with water, and, if desired, converting a resulting salt into the free compound, and/or, if desired, converting in a resulting compound the esterified carboxyl group into another esterified carboxyl group, and/or, if desired, converting a resulting compound into a salt, an N-oxide or a salt of an N-oxide thereof, and/or, if desired, converting a resulting N-oxide into the free compound, and/or, if desired, separating a resulting mixture of isomers into the single isomers.

A salt of the starting material or of an N-oxide thereof, is an addition salt with an acid, primarily a salt with an inorganic, such as mineral, acid, e.g. hydrochloric, hydrobromic, sulfuric, phosphoric acid and the like.

The organic portion of an organic sulfonyloxy group represents an aliphatic radical, such as lower alkyl, e.g. methyl, ethyl and the like, or a carbocyclic aryl radical, particularly a monocyclic carbocyclic aryl group, which may be unsubstituted, but is more preferably substituted by one or more than one substituent, such as halogeno, e.g. chloro, bromo and the like, nitro, carboxyl, functionally converted carboxyl, e.g. carbamyl, cyano, carbomethoxy, carbethoxy and the like, or any other suitable substituent, such as, for example, lower alkyl, e.g. methyl and the like.

Hydrolysis with water may be carried out in the absence of an additional reagent; however, it is more preferably performed in the presence of a base, such as an organic tertiary amine, particularly an aliphatic tertiary amine, for example, an N,N,N-tri-lower alkyl-amine, e.g. N,N,N-trimethylamine, N-ethyl-N,N-dimethylamine, N,N-diethyl-N-methylamine, N,N,N-triethylamine and the like, an N,N,N',N'-tetra-lower alkyl-lower alkylenediamine, e.g. N,N,N',N'-tetramethyl-1,5-pentylene-diamine, N,N,N',N'-tetramethyl-1,6-hexylenediamine, N,N,N',N'-tetraethyl-1-6-hexylenediamine, N,N,N',N'-tetramethyl-1,7-heptylenediamine and the like, or any other suitable aliphatic tertiary amine. Other suitable tertiary amines are also heterocyclic tertiary bases, e.g. pyridine, collidine and the like, or any other useful organic tertiary amine.

The hydrolysis may be carried out in the absence or presence of an additional solvent; suitable inert diluents are, for example, tetrahydrofuran, p-dioxane and the like. The reaction is preferably completed at an elevated temperature, desirably in a closed vessel, and/or in the atmosphere of an inert gas, such as nitrogen.

The 18β-organic sulfonyloxy-3-epi-allo-yohimbane 16β-carboxylic acid esters, salts, N-oxides or salts of N-oxides thereof, which are used as the starting materials in the above procedure, may be prepared according to known methods, for example, by reacting an 18β-hydroxy-3-epi-allo-yohimbane 16β-carboxylic acid ester, a salt, an N-oxide or a salt of an N-oxide thereof, with an organic sulfonic acid halide, particularly a chloride, as well as a fluoride, bromide and the like, preferably in the presence of a base, particularly of an organic base, e.g. pyridine and the like, and, if desired, carrying out optional steps. The 18β-hydroxy-3-epi-allo-yohimbane 16β - carboxylic acid esters used as the intermediates are known or may be prepared according to known methods.

The 18α-hydroxy-3-epi-allo-yohimbane 16β-carboxylic acid esters, the salts, N-oxides or salts of N-oxides may also be prepared by removing in a Δ³-18α-hydroxy-allo-yohimbane 16β-carboxylic acid ester or a salt of such compound, the double bond extending from the 3-position by reduction in an acidic milieu, and, if desired, carrying out the optional steps.

The anion of a salt used as the starting material stands primarily for the anion of a strong inorganic acid, particularly a mineral acid, such as a hydrohalic acid, e.g. hydrochloric, hydrobromic acid and the like, or phosphoric acid, a halogenophosphoric acid, e.g. chlorophosphoric acid and the like, or perchloric acid or any other suitable acid. It may also represent the anion of an organic acid; a salt with an organic acid may be present whenever a solution of the starting material in a solvent containing an organic acid, e.g. acetic acid and the like, is used in the reduction procedure.

The removal of the double bond extending from the 3-position may be carried out according to known reduction procedures in an acidic medium, particularly by treating a solution of the starting material in an acid, such as, for example, acetic acid (preferably in the form of aqueous acetic acid), perchloric acid and the like, or a mixture of such acids, with a metal. Together with the acid, the metal furnishes the nascent hydrogen capable of reducing the double bond; zinc, in the presence of an acid, e.g. acetic, perchloric acid and the like, yields a very useful reducing reagent. Zinc in the presence of perchloric acid, which may be used in an aqueous mixture or in admixture with another acid, e.g. acetic acid and the like, represents the preferred reagent; this reagent is particularly suitable because the rate of reduction is fast, and any contact of the starting material, as well as the reduction product, with the acidic medium can be kept to a minimum. Organic, particularly water-soluble organic, solvents, such as ethers, e.g. tetrahydrofuran, p-dioxane and the like, lower alkanones, e.g. acetone and the like, or any other suitable solvent may be present as additional diluents, if desired, together with water. The reduction may be carried out at room temperature, or, if necessary, under cooling or at an elevated temperature.

The product of the reduction procedure may be isolated, for example, by neutralizing the reaction mixture with an alkaline reagent, e.g. ammonia and the like, if desired, after removing the solvent or part of it, and extracting the organic material with a solvent, or by any other suitable isolation method.

The starting materials used in the above procedure are new and are intended to be included within the scope of the present invention. A preferred group of starting materials is represented, for example, by the lower alkyl 3-dehydro-18-epi-reserpates, in which lower alkyl has from one to seven, especially from one to four carbon atoms, e.g. methyl 3-dehydro-18-epi-reserpate, ethyl 3-dehydro-18 - epi - reserpate, n-propyl 3-dehydro-18-epi-reserpate, isopropyl 3-dehydro-18-epi-reserpate, n-butyl 3-dehydro-18-epi-reserpate and the like, and the lower alkyl 3-dehydro-18-epi-deserpidates, in which lower alkyl has from one to seven, especially from one to four carbon atoms, e.g. methyl 3-dehydro-18-epi-deserpidate, ethyl 3-dehydro-18-epi-deserpidate, n-propyl 3-dehydro-18-epi-deserpidate, isopropyl 3-dehydro-18-epi-deserpidate, n-butyl 3-dehydro-18-epi-deserpidate and the like, or the salts of these compounds. Salts of the above-mentioned compounds contain as anions those of inorganic acids, such as hydrohalic acids, e.g. hydrochloric, hydrobromic acid and the like, phosphoric acid, halogenophosphoric acids, e.g. chlorophosphoric acid and the like, or perchloric acid or other suitable inorganic acids, as well as organic acids, e.g. acetic acid and the like.

The above-mentioned starting materials may be prepared, for example, by treating an 18β-hydroxy-3-oxo-2,3-seco-allo-yohimbane 16β-carboxylic acid ester with an organic sulfonic acid halide, e.g. chloride and the like, preferably in the presence of an organic base, e.g. pyridine and the like, reacting the resulting 18β-organic sulfonyloxy-3-oxo-2,3-seco-allo-yohimbane 16β-carboxylic acid ester with a suitable ring closing reagent, e.g. phosphorous oxychloride or any other analogous ring closing reagent, and hydrolyzing in a resulting $\Delta^3$-18β-organic sulfonyloxy-allo-yohimbene 16β-carboxylic acid ester or a salt thereof, the organic sulfonyloxy group by treatment with water, preferably in the presence of a suitable organic tertiary base, e.g. N,N,N-triethylamine and the like, and, if desired, converting a resulting compound into a salt thereof. The above reactions are carried out according to known or previously described methods.

The preparation of the starting materials may be modified, for example, an 18β-organic-sulfonyloxy-3-oxo-2,3-seco-allo-yohimbane 16β-carboxylic acid ester may first be hydrolyzed by treatment with water, preferably in the presence of an organic tertiary base, e.g. N,N,N-triethylamine and the like, the free hydroxyl group in the resulting 18α-hydroxy-3-oxo-2,3-seco-allo-yohimbane 16β-carboxylic acid ester may be acylated, for example, by treatment with a suitable carboxylic acid halide, e.g. acetyl chloride, 3,4,5-trimethoxybenzoyl chloride, 4-ethoxycarbonyloxy-3,5-dimethoxybenzoyl chloride, 3,4,5-trimethoxy-cinnamoyl chloride or any other analogous carboxylic acid halide, or with a carboxylic acid anhydride, e.g. acetic acid anhydride and the like, in the presence of an organic base, e.g. pyridine and the like, the resulting 18α-acylated hydroxy-3-oxo-2,3-seco-allo-yohimbane 16β-carboxylic acid ester may then be treated with a ring closing reagent, e.g. phosphorus oxychloride and the like, and the 18α-acylated hydroxy group in a resulting $\Delta^3$-acylated hydroxy-allo-yohimbene 16β-carboxylic acid ester or a salt thereof may be cleaved by treatment with a base, for example, a metal alcoholate, particularly an alkali metal lower alkanolate, e.g. sodium or potassium methanolate, ethanolate, n-propanolate and the like, preferably in the presence of the respective lower alkanol, e.g. methanol, ethanol, n-propanol and the like, or by treatment with another basic reagent, such as an alkali metal hydroxide, e.g. lithium hydroxide, sodium hydroxide, potassium hydroxide and the like, or any other suitable reagent, and, if desired, a resulting compound may be converted into a salt thereof. These reactions are carried out according to known or previously-described methods.

An additional method for the preparation of the 18α-hydroxy-3-epi-allo-yohimbane 16β-carboxylic acid esters, salts N-oxides or salts of N-oxides thereof, comprises isomerizing an 18α-hydroxy-allo-yohimbane 16β-carboxylic acid ester by treatment with an acid and isolating the desired 18α-hydroxy-3-epi-allo-yohimbane 16β-carboxylic acid ester, a salt, an N-oxide or a salt of an N-oxide thereof, and, if desired, carrying out the optional steps.

Acids used in the above isomerization procedure are, for example, organic carboxylic acids, particularly aliphatic carboxylic acids, such as lower alkanoic acids, e.g. acetic, propionic acid and the like, primarily glacial acetic acid, organic sulfonic acids, particularly monocyclic carbocyclic aryl sulfonic acids, e.g. p-toluene sulfonic acid and the like, or lower alkane sulfonic acids, e.g. methane sulfonic acid and the like, or strong mineral acids, such as hydrohalic acids, e.g. hydrogen chloride and the like, or mixtures of acids. For example, a monocyclic carbocyclic aryl sulfonic acid, e.g. p-toluene sulfonic acid and the like, may advantageously be used together with one of the aliphatic carboxylic acids mentioned above, for example, with glacial acetic acid. The reaction may be carried out in the absence or presence of an additional solvent; for example, p-toluene sulfonic acid may also be used in the presence of an organic base, e.g. collidine and the like, whereas hydrogen chloride may be used in the presence of an anhydrous lower alkanol, e.g. methanol, ethanol and the like. Isomerization may occur at room temperature, or more readily at an elevated temperature, in an open or in a closed vessel, preferably in an atmosphere of nitrogen.

Optimum yields for the isomerization reaction are obtained by removing the desired product from the reaction milieu, thus displacing the reaction equilibrium in favor of the product. The removal may be accomplished by separating the product, if desired, in the form of a salt thereof, from the starting material by exploiting differences in relative solubilities in different solvent systems. For example, the product or a salt thereof may be separated from the starting material or a salt thereof either by adsorption on a suitable material, such as aluminum oxide, paper and the like, and subsequent fractional elution, or by fractional crystallization from a suitable solvent or solvent mixture. The recovered starting material freed from the desired product, can then be recycled into the isomerization process, to enhance the overall yield of the reaction.

The starting materials used in the above procedure are new and are intended to be included within the scope of the invention. The 18α-hydroxy-allo-yohimbane 16β-carboxylic acid esters may be represented, for example, by lower alkyl 18-epi-3-iso-reserpates, e.g. methyl 18-epi-3-iso-reserpate, ethyl 18-epi-3-iso-reserpate, n-propyl 18-epi-3-iso-reserpate and the like, as well as by lower alkoxy-lower alkyl 18-epi-3-iso-reserpates, e.g. 2-methoxyethyl 18-epi-3-iso-reserpate and the like, lower alkyl 18-epi-3-iso-deserpidates, e.g. methyl 18-epi-3-iso-deserpidate, ethyl 18-epi-3-iso-deserpidate, n-propyl 18-epi-3-iso-deserpidate and the like, or salts of such compounds.

The 18α-hydroxy-allo-yohimbane 16β-carboxylic acid esters used as the starting materials in the above isomerization procedure may be prepared, for example, by removing in a $\Delta^3$-18α-hydroxy-allo-yohimbene 16β-carboxylic acid ester or a salt thereof, the double bond extending from the 3-position by reduction, and, if desired, carrying out optional steps.

The above-mentioned removal of the double bond extending from the 3-position is carried out according to known methods, preferably in a neutral or basic medium, for example, by catalytic hydrogenation, such as by treatment with hydrogen in the presence of a catalyst containing a metal of the eighth group of the periodic system, e.g. nickel, palladium and the like, such as Raney nickel, palladium black and the like, preferably in the presence of a solvent, such as a lower alkanol, e.g. methanol, ethanol and the like, or any other suitable diluent. The reduction of the double bond extending from the 3-position may also be accomplished by treating the 3-dehydro-intermediate with a light metal hydride, particularly a borohydride, such as an alkali metal borohydride, e.g. lithium borohydride, sodium borohydride, potassium borohydride and the like, or any other equivalent reducing reagent, or with a metal amalgam in the presence of a moist solvent, such as an alkali metal amalgam, e.g. sodium amalgam and the like, in the presence of moist diethyl ether or any other suitable moist solvent.

The starting materials may also be obtained by hydrolyzing in an 18β-organic sulfonyloxy-allo-yohimbane 16β-carboxylic acid ester, a salt, an N-oxide or a salt of an N-oxide thereof the organic sulfonyloxy group by treatment with water in the presence of an organic tertiary amine; the above hydrolysis is carried out according to the previously-described method.

As has been mentioned hereinbefore, the esterified carboxyl group in a resulting 18α-hydroxyl-3-epi-allo-yohimbane 16β-carboxylic acid ester may be converted into another 16β-carboxylic acid ester group.

Such conversion may be achieved by transesterification, for example, by treating the starting material with an alcohol, primarily a lower alkanol, e.g. methanol, ethanol, propanol, butanol, isobutanol and the like. Other suitable alcohols are substituted lower alkanols, such as an etherified hydroxy-lower alkanol, for example, a lower alkoxy-lower alkanol and the like, a tertiary amino-lower alkanol, such as an N,N-di-lower alkylamino-lower alkanol and the like, in which the etherified hydroxyl and the tertiary amino groups are separated from the hydroxyl group by at least two, preferably by from two to three carbon atoms; examples of such substituted lower alkanols are, for example, 2-methoxyethanol, 2-ethoxyethanol, 3-methoxypropanol, 2-N,N-dimethylethanol, 2-N,N-diethylaminoethanol and the like.

Transesterification is carried out in the presence of a transesterification, particularly a basic transesterification, catalyst. Such catalysts are, for example, alcoholate ions, as, for example, furnished by alkali metal lower alkanolates, e.g. lithium, sodium or potassium methanolate, ethanolate, n-propanolate, n-butanolate, isobutanolate and the like, alkaline earth metal lower alkanolates, e.g. barium or strontium methanolate, ethanolate, n-propanolate, n-butanolate, isobutanolate and the like, or aluminum lower alkanolates, e.g. aluminum methanolate, ethanolate, n-propanolate, isopropanolate, n-butanolate, isobutanolate and the like. The individual lower alkanolate catalysts are employed together with the corresponding lower alkanol used as the transesterification reagent. Other alcohols, such as the substituted lower alkanols previously mentioned, may be used in the presence of the corresponding alkali metal, alkaline earth metal or aluminum alcoholates. Other basic transesterification catalysts are, for example, alkali metal cyanides, e.g. potassium cyanide and the like, or strong quaternary ammonium hydroxides, e.g. benzyl-trimethyl-ammonium hydroxide and the like. The transesterification reaction may also be catalyzed by acidic reagents; inorganic acids, such as tungstic acid and the like, or organic acids, such as p-toluene sulfonic acid and the like, may be used.

Apart from the esterifying alcohols, which may simultaneously serve as diluents, other inert solvents may be used in the above-mentioned transesterification reaction; carbocyclic aryl hydrocarbons, e.g. benzene, toluene and the like, are examples of such inert solvents. If necessary, the reaction may be carried out at an elevated temperature, under increased pressure and/or in the atmosphere of an inert gas, e.g. nitrogen.

An esterified carboxyl group may also be converted into another esterified carboxyl group by hydrolysis of the 16β-carboxylic acid ester group in an 18α-hydroxy-3-epi-allo-yohimbane 16β-carboxylic acid ester and reesterification of the free carboxyl group in a resulting 18α-hydroxy-3-epi-allo-yohimbane 16β-carboxylic acid.

Hydrolysis may be carried out according to known methods, for example, the esterified carboxyl group may be cleaved by treatment with an alkali metal hydroxide, e.g. sodium hydroxide, potassium hydroxide and the like, preferably in the presence of a lower alkanol, e.g. methanol, ethanol and the like, or, more especially in an aqueous solution of such lower alkanol.

The free carboxyl group in a resulting 18α-hydroxy-3-epi-allo-yohimbane 16β-carboxylic acid may be esterified according to known methods; for example, the starting material, preferably a solution thereof, may be treated with a diazo-reagent, such as, for example, a lower diazoalkane, e.g. diazomethane, diazoethane, n-diazopropane, diazo-isopropane, n-diazobutane, diazo-isobutane and the like, or a substituted lower diazo-alkane, for example, an etherified hydroxy-lower diazo-alkane, such as a lower alkoxy-lower diazo-alkane, in which lower alkoxy is separated from the diazo group by at least two, preferably by from two to three carbon atoms, e.g. 2-methoxy-diazoethane, 2-ethoxy-diazoethane, 2-n-propyloxy-diazoethane, 3-methoxy-diazopropane and the like, a tertiary amino-lower diazo-alkane, particularly an N,N-di-lower alkyl-amino-lower diazo-alkane, in which the N,N-di-lower alkylamino group is separated from the diazo group by at least two, preferably by from two to three, carbon atoms, e.g. 2-N,N-di-methylamino-diazoethane, 2-N,N-diethylamino-diazoethane, 3 - N,N-dimethylamino-diazopropane and the like, or any other suitable diazo-compound. The diazo reagents are advantageously used in solution with an inert diluent, such as, for example, an ether, e.g. diethyl ether and the like, or they may be distilled out of their solution into a solution of the starting material. An excess of the diazo-compound present after the completion of the reaction may be destroyed, for example, by adding an additional carboxylic acid, such as acetic, benzoic acid and the like.

The 18α-hydroxy-3-epi-allo-yohimbane 16β-carboxylic acids resulting from the hydrolysis of 18α-hydroxy-3-epi-allo-yohimbane 16β-carboxylic acid esters are new and are intended to be included within the scope of the invention. This group of free acids is represented, for example, by 18-epi-reserpic acid and 18-epi-deserpidic acid, as well as acid addition salts, N-oxides and acid addition salts of N-oxides thereof.

Based on the above-described esterification procedure, the 18α-hydroxy-3-epi-allo-yohimbane 16β-carboxylic acids may also be used as starting materials for the preparation of 18α-hydroxy-3-epi-allo-yohimbane 16β-carboxylic acid esters; this method comprises esterifying in an 18α-hydroxy-3-epi-allo-yohimbane 16β-carboxylic acid, a salt, an N-oxide or a salt of an N-oxide thereof, the 16β-carboxyl group by treatment with a diazo-compound, and, if desired, carrying out the optional steps. The esterification is carried out as previously described.

As has been hereinbefore mentioned, the 18α-hydroxy-3-epi-allo-yohimbane 16β-carboxylic acid esters, salts, N-oxides or salts of N-oxides may be converted into the 18α-acyloxy-3-epi-allo-yohimbane 16β-carboxylic acid esters, salts, N-oxides or salts of N-oxides thereof. These compounds have tranquilizing and sedative effects, as well as antihypertensive and antifibrillatory properties and can be used accordingly; as previously shown, these diesters, particularly those in which acyl represents the acyl radical of an organic sulfonic acid, can also be used as intermediates.

The acyl group may stand for the acyl radical of an organic carboxylic acid, such as an aliphatic carboxylic acid, a carbocyclic aryl carboxylic acid, a carbocyclic aryl-aliphatic carboxylic acid, a heterocyclic aryl carboxylic acid, a heterocyclic aryl-aliphatic carboxylic acid and the like.

An aliphatic carboxylic acid may be a lower alkanoic acid, a lower alkenoic acid, a lower alkynoic acid, as well as a cycloaliphatic carboxylic acid, such as a cycloalkane carboxylic acid, a cycloalkene carboxylic acid, or a cycloaliphatic-aliphatic carboxylic acid, such as a cycloalkyl-lower alkanoic acid, cycloalkyl-lower alkenoic acid and the like, which acids may contain additional, such as functional, groups as substituents. Examples of such acids are lower alkanoic acids, e.g. acetic, propionic, butyric, isobutyric, trimethylacetic acid and the like, as well as hexahydrobenzoic, cyclopentylpropionic, acrylic, methylacrylic, crotonic, isocrotonic, angelic, tiglic, tetrolic acid and the like, substituted lower aliphatic acids, e.g. ethoxycarbonic, pyruvic, methoxyacetic, phenoxyacetic, N,N-dimethylaminoacetic, acetoacetic, shikimic, prephenic acid and the like, or amino carboxylic acids, e.g. glutamic acid and the like. Aliphatic carboxylic acids are also dicarboxylic acids, e.g. malonic, succinic, glutaric, malic, fumaric, maleic, tartaric, citric, tetrahydrophthalic acids and the like, or analogous aliphatic carboxylic acids.

The acyl radical is also the radical of a carbocyclic aryl carboxylic acid; benzoic acid and benzoic acids containing one or more than one of the same or of different substituents, such as lower alkyl, hydroxyl, lower alkoxy, lower alkylenedioxy, lower alkanoyloxy, lower alkoxycarbonyloxy, nitro, amino, halogen, lower alkylmercapto, trifluoromethyl and the like, form the preferred group of acids furnishing the acyl radical. Such acids are, for example, benzoic acid, lower alkyl-benzoic acids, e.g. o-toluic, p-toluic, 3,4,5-trimethyl-benzoic acid and the like, hydroxy-benzoic acids, e.g. 4-hydroxy-benzoic, 3,4-dihydroxy-benzoic, 2,5-dihydroxy-benzoic acid and the like, lower alkoxy-benzoic acids, particularly methoxy-benzoic acids, e.g. 4-methoxy-benzoic, 3,4,5-trimethoxy-benzoic and the like, as well as 4-ethoxy-benzoic, 3,4,5-triethoxy-benzoic acid and the like, benzoic acids substituted by lower alkyl and lower alkoxy, e.g. 3,5-dimethyl-4-methoxy-benzoic acid and the like, benzoic acids substituted by hydroxyl and lower alkoxy, e.g. vanillic, syringic acid and the like, lower alkylenedioxy-benzoic acids, e.g. piperonylic acid and the like, lower alkanoyloxy-benzoic acids, e.g. 4-acetoxy-benzoic acid and the like, lower alkoxy-carbonyloxy-benzoic acids, e.g. 4-ethoxy-carbonyloxy-benzoic acid and the like, benzoic acids substituted by lower alkoxy and lower alkoxy-carbonyloxy, e.g. O-ethoxy-carbonyl-vanillic, O-methoxy-carbonyl-syringic, O-ethoxycarbonyl-syringic acid and the like, nitrobenzoic acids, e.g. 3-nitro-benzoic, 4-nitro-benzoic acid and the like, amino-benzoic acids, e.g. 3-aminobenzoic, 4-amino-benzoic acid and the like, N,N-di-lower alkyl-aminobenzoic acids, e.g. 3-N,N-dimethylamino-benzoic, 4-N,N-dimethylamino-benzoic acid and the like, halogeno-benzoic acids, e.g. 4-fluoro-benzoic, 4-chloro-benzoic, 3,4-dichlorobenzoic acid and the like, lower alkyl-mercapto-benzoic acids, e.g. 4-methyl-mercapto-benzoic acid and the like, trifluoromethylbenzoic acids, e.g. 4-trifluoromethyl-benzoic acid and the like, or other analogous benzoic acids.

Acyl radicals may also be furnished by monocyclic carbocyclic aryl dicarboxylic acids, e.g. phthalic, isophthalic, terephthalic acid and the like, as well as those of bicyclic carbocyclic aryl carboxylic acids, e.g. 1-naphthoic, 2-naphthoic acid or substituted naphthoic acids, e.g. 1-methoxy-2-naphthoic, 1-ethoxy-carbonyloxy-2-naphthoic acid and the like.

A carbocyclic aryl-aliphatic carboxylic acid is primarily a lower alkanoic or lower alkenoic acid substituted by monocyclic carbocyclic aryl radicals. Examples of such acids are phenyl-lower alkanoic acids, e.g. phenylacetic, 3-phenylpropionic, diphenylacetic acid and the like, (lower alkoxy-phenyl)-lower alkanoic acids, e.g. 4-methoxy-phenylacetic, 3-(3,4,5-trimethoxy-phenyl)-propionic acid and the like, lower alkoxy-(phenyl)-lower alkanoic acids, e.g. 2-methoxy-2-phenyl-acetic acid and the like, lower alkoxy-carbonyloxy-(phenyl)-lower alkanoic acids, e.g. 2-ethoxy-carbonyloxy-2-phenyl-acetic acid and the like, phenyl-lower alkenoic acids, e.g. cinnamic acid and the like, (lower alkoxy-phenyl)-lower alkenoic acids, e.g. 4-methoxy-cinnamic, 3,4,5-trimethoxy-cinnamic acid and the like, phenyl-lower alkenoic acids, in which phenyl is substituted by lower alkoxy and hydroxyl, e.g. ferulic acid and the like, phenyl-lower alkenoic acids, in which phenyl is substituted by lower alkoxy and lower alkoxy-carbonyloxy, e.g. O-ethoxy-carbonyl-ferulic acid and the like, and analogous acids.

Heterocyclic aryl carboxylic acids are particularly monocyclic heterocyclic aryl carbocyclic acids, which contain nitrogen, sulfur or oxygen as ring hetero atoms. Such acids are, for example, pyridine carboxylic acids, e.g. nicotinic, isonicotinic acid and the like, thiophene carboxylic acids, e.g. 2-thienoic acid and the like, furane carboxylic acids, e.g. 2-furoic acid and the like, as well as bicyclic heterocyclic aryl carboxylic acids, for example, quinoline carboxylic acids, e.g. 6-quinoline carboxylic acid and the like. Heterocyclic aryl-lower aliphatic carboxylic acids are primarily monocyclic heterocyclic aryl-lower alkanoic acids, such as pyridyl-lower alkanoic acids, e.g. 3-pyridyl-acetic, 4-pyridyl-acetic acid and the like, thienyl-lower alkanoic acids, e.g. 2-thienyl-acetic acid and the like.

The acyl radical also stands for the radical of an organic sulfonic acid, which may be selected from aliphatic sulfonic acids, particularly lower alkane sulfonic acids, e.g. methane sulfonic, ethane sulfonic acid and the like, hydroxy-lower alkane sulfonic acids, e.g. 2-hydroxy-ethane sulfonic acid and the like, or more especially from carbocyclic aryl sulfonic acids, for example, monocyclic carbocyclic aryl sulfonic acids, such as benzene sulfonic, or primarily halogeno-benzene sulfonic acids, e.g. 4-fluorobenzene sulfonic, 2-chloro-benzene sulfonic, 3,4-dichloro-benzene sulfonic, 4-bromo-benzene sulfonic acid and the like, or nitro-benzene sulfonic acids, e.g. 3-nitrobenzene sulfonic, 4-nitro-benzene sulfonic acid and the like, as well as carboxy-benzene sulfonic acids, or particularly functionally converted carboxy-benzene sulfonic acids, e.g. 4-carbomethoxy-benzene sulfonic, 4-carbethoxy-benzene sulfonic, 4-carbamyl-benzene sulfonic, 4-cyano-benzene sulfonic acid and the like, lower alkyl-benzene sulfonic, e.g. p-toluene sulfonic acid and the like, or any other suitable organic sulfonic acid.

Salts of the above diester or of N-oxides thereof are primarily acid addition salts with inorganic acids, particularly with mineral acids, e.g. hydrochloric, hydrobromic, sulfuric acids and the like, as well as with organic acids, e.g. acetic, tartaric, methane sulfonic acid and the like; salts of pharmaceutically active compounds are particularly pharmaceutically acceptable, non-toxic acid addition salts.

18α-acyloxy-3-epi-allo-yohimbane 16β-carboxylic acid esters, particularly those of the formula:

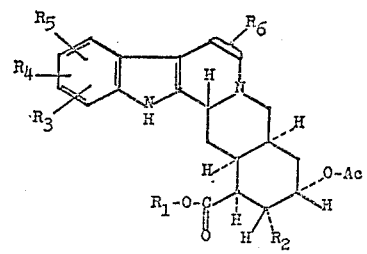

in which $R_1$, $R_2$, $R_3$, $R_4$, $R_5$, $R_6$ have the previously-given meaning, and Ac stands for the acyl radical of an organic carboxylic or of an organic sulfonic acid, salts, N-oxides, like. Inert solvents are, for example, halogenated lower alkanes, e.g. methylene chloride, chloroform, ethylene chloride and the like, lower alkanols, e.g. methanol, ethanol and the like, or any other suitable solvent. In the N-oxidation reaction an excess of the oxidation reagent and/or an increase in temperature should be avoided in order to prevent oxidative degradation.

Resulting N-oxides or salts thereof may be converted into the free compounds according to methods known per se, for example, by treatment with a reducing reagent such as hydrogen in the presence of a catalyst, which contains a metal of the eighth group of the periodic system, such as nickel, platinum, palladium and the like, e.g. Raney nickel, platinum oxide and the like, or more appropriately, with nascent hydrogen, as generated, for example, by heavy metals, e.g. iron, zinc, tin and the like, in the presence of acids, e.g. acetic acid and the like, or with any other appropriate reducing reagent or method.

The compounds of the present invention, as well as the starting materials and intermediates used in their formation, may be present in the form of mixtures or racemates, single racemates or antipodes.

A mixture of racemic compounds may be separated into the individual racemic compounds on the basis of physicochemical differences, such as solubility, for example, by fractionated crystallization and the like.

Racemates of intermediate and final products may be resolved into antipodes. Racemates of final products or intermediates, which form acid addition salts, may be resolved, for example, by treating a solution of the free racemic base in a suitable solvent with one of the optically active forms of an acid containing an asymmetric carbon atom, which may also be employed in solution. Especially useful as optically active forms of salt-forming acids having an asymmetric carbon atom are D- and L-tartaric acid, as well as the optically active forms of di-o-toluyl-tartaric, malic, mandelic, camphor-10-sulfonic, quinic acid and the like.

A salt may then be isolated, which is formed by the optically active acid with one of the optically active forms of the base. From a resulting salt, the free and optically active compound may be obtained according to known methods used for the conversion of a salt into a free compound, for example, as outlined hereinbefore; a resulting optically active base may be converted into an acid addition salt with one of the acids mentioned hereinbefore. The optically active forms may also be obtained by resolution with biochemical methods.

The invention also comprises any modification of the process wherein a compound obtainable as an intermediate at any state of the process is used as starting material and the remaining step(s) of the process is(are) carried out. It also includes any new intermediates, which may be formed in one of the procedures outlined hereinbefore.

In the process of this invention such starting materials are preferably used which lead to final products mentioned in the beginning as preferred embodiments of the invention.

This is a continuation-in-part application of our application Serial No. 110,323, filed May 16, 1961, now abandoned, which in turn is a continuation-in-part application of our application Serial No. 73,558, filed December 5, 1960, now abandoned, which in turn is a continuation-in-part application of our application Serial No. 46,884, filed August 2, 1960.

The following examples illustrate the invention and are not to be construed as limitations thereon. Temperatures are given in degrees centigrade.

Example 1

A mixture of 6.34 g. of methyl 18-O-(4-bromo-phenyl-sulfonyl)-reserpate, 100 ml. of water, 30 ml. of p-dioxane and 1.2 g. of N,N,N-triethylamine is heated on the steam-bath for 41 hours under an atmosphere of nitrogen. The organic solvent is evaporated under reduced pressure, during which operation a precipitate is formed, which is filtered off and dissolved in methylene chloride. The resulting organic solution is extracted with several portions of 5 percent aqueous hydrochloric acid until the acidic extracts no longer give a precipitate on addition of ammonium hydroxide. The combined precipitates, resulting from the treatment of the acidic extracts with aqueous ammonia, are washed with water and dried to yield 2.73 g. of methyl 18-epi-reserpate monohydrate, M.P. 220–222° (decomposition). Upon drying at 140° under reduced pressure, the above hydrate can be converted into the solvent-free methyl 18-epi-reserpate of the formula:

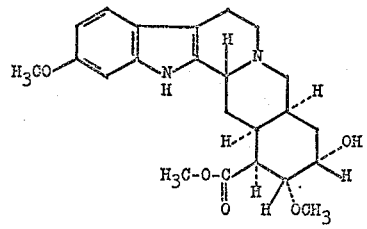

which melts at 220–222°, $[\alpha]_D^{25} = -80.5°$ (in chloroform).

The starting material used in the above reaction may be prepared as follows: To a solution of 10.0 g. of methyl reserpate in 70 ml. of pyridine is added 15.8 g. of 4-bromo-benzene sulfonyl chloride; the reaction mixture is allowed to stand at room temperature for 2½ days and is then poured into ice water. The organic material is extracted with chloroform, the organic extract is washed with a 5 percent aqueous sodium hydroxide solution and subsequently with water until a neutral reaction is obtained. The organic solution is evaporated to dryness, and the resulting methyl 18-O-(4-bromo-phenyl-sulfonyl)-reserpate is recrystallized from acetone, M.P. 209–212°; yield: 5.64 g.

In the above preparation of the starting material 4-bromo-benzene sulfonic acid chloride may be replaced by other organic sulfonic acid halides, such as methane sulfonyl chloride, ethane sulfonyl chloride, 3-nitro-benzene sulfonyl chloride, 4-nitro-benzene sulfonyl chloride and the like, and upon treatment of a resulting methyl 18-O-organic sulfonyl-reserpate, e.g. methyl 18-O-methyl-sulfonyl-reserpate, methyl 18-O-ethyl-sulfonyl-reserpate, methyl 18-O-(3-nitro-phenyl-sulfonyl)-reserpate, methyl 18-O-(4-nitro-phenyl-sulfonyl)-reserpate and the like, with water, preferably in the presence of a base, such as N,N,N-triethylamine, pyridine and the like, according to the previously-given procedure, methyl 18-epi-reserpate can be formed.

By substituting in the above procedure for the preparation of the starting material, other 18β-hydroxy-3-epi-allo-yohimbane 16β-carboxylic acid esters for the methyl reserpate, and treating these esters with 4-bromo-benzene sulfonyl chloride or any other suitable organic sulfonyl halide, such as methane sulfonyl chloride, ethane sulfonyl chloride, 3-nitro-benzene sulfonyl chloride, 4-nitro-benzene sulfonyl chloride and the like, and hydrolyzing the resulting 18β-organic sulfonyloxy-3-epi-allo-yohimbane 16β-carboxylic acid esters with water, preferably in the presence of an organic tertiary amine, there may be prepared other 18α-hydroxy-3-epi-allo-yohimbane 16β-carboxylic acid esters, such as lower alkyl 18-epi-reserpates other than methyl 18-epi-reserpate, for example, ethyl 18-epi-reserpate, n-propyl 18-epi-reserpate, isopropyl 18-epi-reserpate, n-butyl 18-epi-reserpate, isobutyl 18-epi-reserpate and the like, lower alkyl 18-epi-deserpidates, e.g. methyl 18-epi-deserpidate, ethyl 18-epi-deserpidate, n-propyl 18-epi-deserpidate, isopropyl 18-epi-deserpidate, n-butyl 18-epi-deserpidate, secondary butyl 18-epi-deserpidate, n-pentyl 18-epi-deserpidate and the like, lower alkyl 10-methoxy-18-epi-deserpidates, e.g. methyl 10-methoxy-18-epi-deserpidate, ethyl 10-methoxy-18-epi-deserpidate, n-propyl 10-methoxy-18-epi-deserpidate, isopropyl 10-methoxy-18-epi-deserpidate and the or salts of N-oxides of such compounds, are new and are intended to be included within the scope of this invention.

Particularly important as useful intermediates are the compounds of the formula:

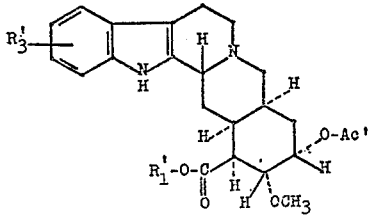

in which $R_1'$ stands for lower alkyl, having preferably from one to four carbon atoms, e.g. methyl, ethyl, n-propyl and the like, $R_3'$ represents lower alkoxy, containing especially from one to four carbon atoms, e.g. methoxy, ethoxy and the like, whereby $R_3'$ is preferably attached to the 10-position or the 11-position, and $Ac'$ stands for the acyl radical of an aliphatic sulfonic acid, particularly a lower alkane sulfonic acid, e.g. methane sulfonic, ethane sulfonic acid and the like, benzene sulfonic acid, a halogeno-benzene sulfonic acid, e.g. 4-bromobenzene sulfonic acid and the like, a nitro-benzene sulfonic acid, e.g. 3-nitro-benzene sulfonic, 4-nitro-benzene sulfonic acid and the like, a cyano-benzene sulfonic acid, e.g. 4-cyano-benzene sulfonic acid and the like, or a lower alkyl-benzene sulfonic acid, e.g. p-toluene sulfonic acid and the like, or acid addition salts of such compounds.

18α-acyloxy-3-epi-allo-yohimbane 16β-carboxylic acid esters, salts, N-oxides or salts of N-oxides thereof, may be prepared, for example, by esterifying in an 18α-hydroxy-3-epi-allo-yohimbane 16β-carboxylic acid ester, particularly in a compound of the formula:

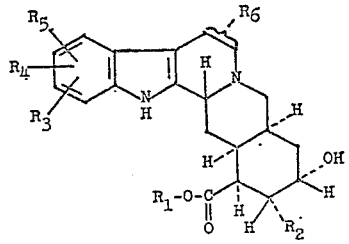

in which $R_1$, $R_2$, $R_3$, $R_4$, $R_5$ and $R_6$ have the previously-given meaning, a salt, an N-oxide or a salt of an N-oxide thereof, the free hydroxyl group by treatment with a reactive functional derivative of an organic acid, and, if desired, converting a resulting salt into a free compound, and/or, if desired, converting a resulting compound into a salt, an N-oxide or a salt of an N-oxide thereof, and/or, if desired, converting a resulting N-oxide into the free compound, and/or, if desired, separating a resulting mixture of isomers into the separate isomers.

The above esterification is carried out according to known methods; a reactive functional derivative of an organic acid is primarily a halide, especially the chloride, or the anhydride of such organic acid. The reaction occurs in the presence of a basic reagent; liquid organic bases, such as pyridine and the like, are particularly suited as reagents, and may simultaneously serve as diluents. Other inert organic solvents may be added to ensure complete solution. The esterification is performed under the exclusion of moisture, if necessary, in the atmosphere of an inert gas, e.g. nitrogen, and/or while cooling.

The 18α-acyloxy-3-epi-allo-yohimbane 16β-carboxylic acid esters or salts, N-oxides and salts of N-oxides thereof, may also be prepared by removing in a $\Delta^3$-18α-acyloxy-allo-yohimbene 16β-carboxylic acid ester or a salt thereof, the double bond extending from the 3-position by reduction, and, if desired, carrying out the optional steps.

Removal of the double bond may be carried out according to the previously-described procedure; zinc in the presence of acetic and/or perchloric acid and of an inert organic solvent, represents the preferred reducing agent.

The above-described starting materials may be prepared, for example, by esterifying in an 18α-hydroxy-3-oxo-2,3-seco-allo-yohimbane 16β-carboxylic acid ester compound the free hydroxy group by treatment with a reactive functional derivative of an acid and ring-closing the resulting 18α-acyloxy-3-oxo-2,3-seco-allo-yohimbane 16β-carboxylic acid ester by treatment with an acid ring closing reagent. Esterification and ring closure are carried out according to known methods, such as those mentioned hereinbefore.

An additional procedure for the preparation of the 18α-acyloxy-3-epi-allo-yohimbane 16β-carboxylic acid esters, salts, N-oxides or salts of N-oxides thereof, comprises isomerizing an 18α-acyloxy-allo-yohimbane 16β-carboxylic acid ester, a salt, an N-oxide or a salt of an N-oxide thereof, by treatment with an acid, and isolating the desired 18α-acyloxy-3-epi-allo-yohimbane 16β-carboxylic acid ester, a salt, an N-oxide or a salt of an N-oxide thereof, and, if desired, carrying out the optional steps.

The isomerization procedure is carried out according to known methods, such as the one described hereinbefore. The starting materials used in the above procedure may be obtained, for example, by removing in a $\Delta^3$-18α-acyloxy-allo-yohimbane 16β-carboxylic acid ester or a salt thereof, the double bond extending from the 3-position, and, if desired, carrying out the optional step. The removal of the double bond is achieved by using known methods, for example, those mentioned hereinbefore.

Since the above-mentioned diesters may be prepared independently from 18α-hydroxy-3-epi-allo-yohimbane 16β-carboxylic acid esters, the latter may, therefore, also be obtained by hydrolyzing in an 18α-acyloxy-3-epi-allo-yohimbane 16β-carboxylic acid ester, a salt, an N-oxide or a salt of an N-oxide thereof, the acyloxy group attached to the 18α-position, and, if desired, carrying out the optional steps. The removal of the acyl group is achieved by using known methods, for example, by treatment with a hydrolyzing reagent, such as a basic alcoholysis reagent, for example, with a lower alkanolate, e.g. methanolate, ethanolate, n-propanolate, n-butanolate and the like, preferably in the presence of a lower alkanol, e.g. methanol, ethanol, n-propanol, isopropanol, n-butanol and the like, or with another basic reagent, such as alkali metal hydroxide, e.g. lithium hydroxide, sodium hydroxide, potassium hydroxide and the like, or any other suitable reagent.

The compounds of this invention or N-oxides thereof may be obtained in the form of the free bases or as the salts thereof. A salt, including the salt of an N-oxide, may be converted into the free base, for example, by reacting the former with an alkaline reagent, such as, for example, aqueous ammonia, silver oxide and the like, or with an anion exchange resin or any other suitable reagent. A free base or the N-oxide thereof may be converted into its acid addition salts with one of the inorganic or organic acids outlined hereinbefore; the reaction may be carried out, for example, by treating a solution of the free base in a suitable solvent with the acid or a solution thereof, and isolating the resulting salt. The salts may also be obtained as the hemihydrates, monohydrates, sesquihydrates or polyhydrates depending on the conditions used in the formation of the salts.

N-oxides of the compounds of the present invention may be formed according to known methods; for example, a resulting compound, preferably a solution thereof in an inert solvent, may be reacted with an N-oxidizing reagent, such as, for example, hydrogen peroxide, ozone, persulfuric acid, or more especially, organic peracids, such as organic percarboxylic acids, e.g. peracetic, perbenzoic, monoperphthalic acid and the like, or persulfonic acids, e.g. p-toluene persulfonic acid and the like, as well as, for example, lower alkyl 5-methyl-18-epi-reserpates, e.g. methyl 5-methyl-18-epi-reserpate, ethyl 5-methyl-18-epi-reserpate and the like, lower alkyl 5-methyl-18-epi-deserpidates, e.g. methyl 5-methyl-18-epi-deserpidate, ethyl 5-methyl-18-deserpidate and the like, lower alkyl 6-methyl-18-epi-reserpates, e.g. methyl 6-methyl-18-epi-reserpate, n-propyl 6-methyl-18-epi-reserpate and the like, lower alkyl 6-methyl-18-epi-deserpidates, e.g. methyl 6-methyl-18-epi-deserpidate, ethyl 6-methyl-18-epi-deserpidate and the like, lower alkyl 9-methyl-18-epi-deserpidates, e.g. methyl 9-methyl-18-epi-deserpidate, ethyl 9-methyl-18-epi-deserpidate, n-propyl 9-methyl-18-epi-deserpidate and the like, lower alkyl 10-methyl-18-epi-deserpidates, e.g. methyl 10-methyl-18-epi-deserpidate, ethyl 10-methyl-18-epi-deserpidate, isopropyl 10-methyl-18-epi-deserpidate and the like, lower alkyl 11-methyl-18-epi-deserpidates, e.g. methyl 11-methyl-18-epi-deserpidate, ethyl 11-methyl-18-epi-deserpidate, n-propyl 11-methyl-18-epi-deserpidate and the like, lower alkyl 9-methoxy-18-epi-deserpidates, e.g. methyl 9-methoxy-18-epi-deserpidate, ethyl 9-methoxy-18-epi-deserpidate, n-propyl 9-methoxy-18-epi-deserpidate and the like, lower alkyl 10-methoxy-18-epi-reserpates, e.g. methyl 10-methoxy-18-epi-reserpate, ethyl 10 - methoxy-18-epi-reserpate and the like, lower alkyl 9,10-dimethoxy-18-epi-reserpates, e.g. methyl 9,10-dimethoxy-18-epi-reserpate, ethyl 9,10-dimethoxy-18-epi-reserpate and the like, lower alkyl 10-ethoxy-18-epi-deserpidates, e.g. methyl 10-ethoxy-18-epi-deserpidate, ethyl 10 - ethoxy-18-epi-deserpidate and the like, lower alkyl 11-ethoxy-18-epi-deserpidates, e.g. methyl 11-ethoxy-18-epi-deserpidate, ethyl 11-ethoxy-18-epi-deserpidate and the like, lower alkyl 11-n-propyloxy-18-epi-deserpidates, e.g. methyl 11-n-propyloxy-18-epi-deserpidate, ethyl 11-n-propyloxy-18-epi-deserpidate and the like, lower alkyl 11-isopropyloxy-18-epi-deserpidates, e.g. methyl 11-isopropyloxy-18-epi-deserpidate, ethyl 11-isopropyloxy-18-epi-deserpidate, n-butyl 11-isopropyloxy-18-epi-deserpidate and the like, lower alkyl 11-n-butyloxy-18-epi-deserpidates, e.g. methyl 11-n-butyloxy-18-epi-deserpidate, ethyl 11-n-butyloxy-18-epi-deserpidate and the like, lower alkyl 12-methoxy-18-epi-deserpidates, e.g. methyl 12-methoxy-18-epi-deserpidate, ethyl 12-methoxy-18-epi-deserpidate, n-propyl 12-methoxy-18-epi-deserpidate and the like, lower alkyl 10,11-methylenedioxy-18-epi-deserpidates, e.g. methyl 10,11-methylenedioxy-18-epi-deserpidate, ethyl 10,11-methylenedioxy-18-epi-deserpidate and the like, lower alkyl 10-benzyloxy-18-epi-deserpidates, e.g. methyl 10-benzyloxy-18-epi-deserpidate, ethyl 10-benzyloxy-18-epi-deserpidate, n-propyl 10-benzyloxy-18-epi-deserpidate and the like, lower alkyl 11-benzyloxy-18-epi-deserpidates, e.g. methyl 11-benzyloxy-18-epi-deserpidate, ethyl 11-benzyloxy-18-epi-deserpidate and the like, lower alkyl 11-methylmercapto-18-epi-deserpidates, e.g. methyl 11-methylmercapto-18-epi-reserpate, ethyl 11-methylcapto-18-epi-deserpidate, n-propyl 11-methylmercapto-18-epi-deserpidate and the like, lower alkyl 11-ethylmercapto-18-epi-deserpidates, e.g. methyl 11-ethylmercapto-18-epi-deserpidate, ethyl 11-ethylmercapto-18-epi-deserpidate, n-propyl 11-ethyl-mercapto-18-epi-deserpidate and the like, lower alkyl 10-chloro-18-epi-deserpidates, e.g. methyl 10-chloro-18-epi-deserpidate, ethyl 10-chloro-18-epi-deserpidate, isopropyl 10-chloro-18-epi-deserpidate and the like, lower alkyl 9,12-dichloro-18-epi-deserpidates, e.g. methyl 9,12-dichloror-18-epi-deserpidate, ethyl 9,12-dichloro-18-epi-deserpidate, and the like, lower alkyl 11,12-dichloro-18-epi-deserpidates, e.g. methyl 11,12-dichloro-18-epi-deserpidate and the like, lower alkyl 10-bromo-18-epi-reserpates, e.g. methyl 10-bromo-18-epi-reserpate, ethyl 10-bromo-18-epi-reserpate and the like, lower alkyl 11-fluoro-18-epi-deserpidates, e.g. methyl 11-fluoro-18-epi-deserpidate, ethyl 11-fluoro-18-epi-deserpidate and the like, lower alkyl 17α-desmethoxy-17α-ethoxy-18-epi-reserpates, e.g. methyl 17α-desmethoxy-17α-ethoxy-18-epi-reserpate, ethyl 17α-desmethoxy-17α-ethoxy-18-epi-reserpate, n-propyl 17α-desmethoxy-17α-ethoxy-18-epi-reserpate and the like, lower alkyl 17α-desmethoxy-17α-n-propyloxy-18-epi-reserpates, e.g. methyl 17α - desmethoxy-17α-n-propyloxy-18-epi-reserpate, ethyl 17α-desmethoxy-17α-n-propyloxy-18-epi-reserpate and the like, lower alkyl 17α-desmethoxy-17α-isopropyloxy-18-epi-reserpates, e.g. methyl 17α-desmethoxy-17α-isopropyloxy-18-epi-reserpate, ethyl 17α-desmethoxy-17α-isopropyloxy-18-epi-reserpate and the like, lower alkyl 17α-desmethoxy-17α-ethoxy-18-epi-deserpidates, e.g. methyl 17α-desmethoxy-17α-ethoxy-18-epi-deserpidate, ethyl 17α-desmethoxy-17α-ethoxy-18-epi-deserpidate and the like, lower alkyl 17α-cyano-17α-desmethoxy-18-epi-reserpates, e.g. methyl 17α-cyano-17α-desmethoxy-18-epi-reserpate, ethyl 17α-cyano-17α-desmethoxy-18-epi-reserpate and the like, lower alkyl 17α-cyano-17α-desmethoxy-18-epi-deserpidates, e.g. methyl 17α-cyano-17α-desmethoxy-18-epi-deserpidate, ethyl 17α-cyano-17α-desmethoxy-18-epi-deserpidate and the like, or salts, particularly mineral acid addition salts, of such compounds.

*Example 2*

To an excess of hydrogen chloride in 4 ml. of ethanol is added 0.8 g. of methyl 18-epi-reserpate and the resulting solution is then added drop-wise to 200 ml. of diethyl ether while vigorously stirring. The tan flocculent precipitate is washed three times by decanting with diethyl ether, rapidly filtering the solid material and immediately drying the wet filter cake under reduced pressure to yield 0.75 g. of methyl 18-epi-reserpate hydrochloride, M.P. 220–225°, $[\alpha]_D^{27} = -89°$ (in chloroform).

*Example 3*

A total of 4.32 g. of methyl 18-epi-reserpate monohydrate is dissolved in 50 ml. of pyridine by gentle warming; the solution is cooled to room temperature and 6.7 g. of 4-bromo-benzene sulfonic acid chloride is added. The flask is flushed with nitrogen and is allowed to stand for three days in the dark. The mixture is poured into 200 ml. of ice-water, and the organic material is extracted with methylene chloride. The organic extracts are combined, washed once with water, twice with a 5 percent aqueous solution of sodium carbonate and once with a saturated aqueous solution of sodium chloride. After drying, the organic solvent is evaporated under reduced pressure at 50°, benzene is added to the residue, and the evaporation procedure is repeated to completely remove the pyridine. Again, benzene is added, the precipitate is filtered off and washed with cold benzene. The crude material is recrystallized from acetonitrile to yield 2.92 g. of the desired methyl 18-epi-O-(4-bromo-phenyl-sulfonyl)-reserpate of the formula:

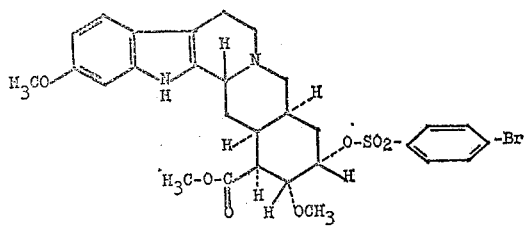

M.P. 210–212° (decomposition), $[\alpha]_D^{26} = -32.5°$ (in chloroform).

Ethyl 18-epi-reserpate, when reacted with 4-bromo-benzene sulfonic acid chloride in the presence of pyridine according to the above procedure, yields the ethyl 18-epi-O-(4-bromo-phenyl-sulfonyl)-reserpate.

*Example 4*

A solution of 0.9 g. of methyl 18-epi-reserpate monohydrate in 10 ml. of pyridine is gently warmed, then cooled to room temperature and treated with 1.92 g. of p-toluene sulfonic acid chloride. The flask is flushed with nitrogen and allowed to stand in the dark for three days. The red solution is poured into 50 ml. of ice-water, and the organic material is extracted with methylene chloride; the organic solution is washed with a 5 percent aqueous solution of sodium carbonate, with water and a saturated solution of sodium chloride and then dried over sodium sulfate. The organic solvent together with some of the pyridine is evaporated under reduced pressure at a temperature not exceeding 60°. Residual pyridine is removed by adding benzene and reevaporating the solvent mixture. The crude, brown, solid residue is first washed with cold acetonitrile and then recrystallized from that solvent to yield 0.76 g. of the white crystalline methyl 18-epi-O-(4-methyl-phenyl-sulfonyl) - reserpate hemihydrate, M.P. 222–225° (decomposition), $[\alpha]_D^{27} = -35.5°$ (chloroform).

Additional 18α-organic sulfonyloxy-3-epi-allo-yohimbane 16β-carboxylic acid esters, such as the above-described members of lower alkyl 18-epi-O-(halogeno-phenyl-sulfonyl-reserpates and lower alkyl 18-epi-O-(lower alkyl-phenyl-sulfonyl)-reserpates are, for example, lower alkyl 18-epi-O-lower alkyl-sulfonyl-reserpates, e.g. methyl 18-epi-O-methyl-sulfonyl-reserpate and the like, lower alkyl 18-epi-O-(phenyl-sulfonyl)-reserpates, e.g., methyl 18-epi-O-(phenyl-sulfonyl)-reserpate and the like, lower alkyl 18-epi-O-(nitro-phenyl-sulfonyl)-reserpates, e.g. methyl 18-epi-O-(3-nitro-phenyl-sulfonyl)-reserpate, methyl 18-epi - O - (4-nitro-phenyl-sulfonyl)-reserpate, ethyl 18-epi-O-(4-nitro-phenyl-sulfonyl)-reserpate and the like, lower alkyl 18-epi-O-(carbo-lower alkoxy-phenyl-sulfonyl)-reserpates, e.g. methyl 18-epi-O-(4-carbethoxy-phenyl-sulfonyl)-reserpate and the like, lower alkyl 18-epi-O-(carbamyl-phenyl-sulfonyl)-reserpates, e.g. methyl 18-epi-O-(4-carbamyl-phenyl-sulfonyl)-reserpate and the like, lower alkyl 18-epi-O-(cyano-phenyl-sulfonyl)-reserpates, e.g. methyl 18-epi-O-(4-cyano-phenyl-sulfonyl)-reserpate and the like as well as the corresponding lower alkyl 18-epi-O-organic sulfonyl-deserpidates, such as lower alkyl 18-epi-O-lower alkyl-sulfonyl-deserpidates, e.g. methyl 18-epi-O-methyl-sulfonyl-deserpidate and the like, lower alkyl 18-epi-O-(halogeno-phenyl-sulfonyl)-deserpidates, e.g. methyl 18-epi-O-(4-bromo-phenyl-sulfonyl)-deserpidate and the like, lower alkyl 18-epi-O-(nitro-phenyl-sulfonyl)-deserpidates, e.g. methyl 18-epi-O-(3-nitro-phenyl-sulfonyl)-deserpidate, methyl 18-epi-O-(4-nitro-phenyl-sulfonyl)-deserpidate and the like, or lower alkyl 10-methoxy-18-epi-O-organic sulfonyl-deserpidates, such as lower alkyl 18-epi-O-lower alkyl-sulfonyl-10-methoxy-deserpidates, e.g., methyl 10-methoxy-18-epi-O-methyl-sulfonyl-deserpidate and the like, lower alkyl 18-epi-O-(halogeno-phenyl-sulfonyl) - 10 - methoxy-deserpidates, e.g. methyl 18-epi-O-(4-bromo-phenyl-sulfonyl)-10-methoxy-deserpidate and the like, lower alkyl 18-epi-O-(lower alkyl-phenyl-sulfonyl) - 10-methoxy-deserpidates, e.g. methyl 10-methoxy-18-epi-O-(4-methyl-phenyl-sulfonyl)-deserpidate and the like, lower alkyl 10-methoxy-18-epi-O-(nitro-phenyl-sulfonyl)-deserpidates, e.g. methyl 10-methoxy-18-epi - O - (4-nitro-phenyl-sulfonyl)-deserpidate and the like, or salts of such compounds.

*Example 5*

A mixture of 1.0 g. of methyl 18-epi-reserpate, 0.67 g., of 3,4,5-trimethoxy-benzoyl chloride and 15 ml. of pyridine is allowed to stand overnight at room temperature and is then poured into water containing a few drops of ammonia. The tan solid is filtered off, washed with water and dissolved in methylene chloride; the organic solution is passed through a column containing a diatomaceous earth preparation and is then evaporated. The residue is crystallized from ether and recrystallized from a mixture of ethyl acetate and diethyl ether to yield methyl 18-epi-O-(3,4,5-trimethoxy-benzoyl)-reserpate (or 18-epi-reserpine) of the formula:

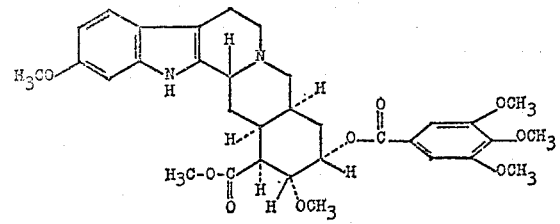

which melts at 141–145°, $[\alpha]_D^{26} = +38°$ (in chloroform); yield: 0.6 g.

Other esters, which may be prepared according to the above procedure using the appropriate starting materials and carboxylic acid halides, particularly chlorides, are, for example, methyl 18-epi-O-propionyl-reserpate,
methyl 18-epi-O-pivaloyl-reserpate,
methyl 18-epi-O-(4-hydroxy-benzoyl)-reserpate,
methyl 18-epi-O-(4-methoxy-benzoyl)-reserpate,
methyl 18-epi-O-(O-methoxy-carbonyl-syringoyl) - reserpate,
methyl 18-epi-O-(4-methoxy-cinnamoyl)-reserpate,
18-epi-rescinnamine,
methyl 18-epi-O-(O-ethoxycarboxyl-feruloyl)-reserpate,
methyl 18-epi-O-nicotinoyl-reserpate,
methyl 18-epi-O-isonicotinoyl-reserpate,
ethyl 18-epi-O-acetyl-reserpate,
ethyl 18-epi-O-propionyl-reserpate,
ethyl 18-epi-O-(3,4,5-trimethoxy-benzoyl)-reserpate,
ethyl 18-epi-O-(3,4,5-triethoxy-benzoyl)-reserpate,
ethyl 18-epi-O-(4-chloro-benzoyl)-reserpate,
ethyl 18-epi-O-(O-methoxy - carbonyl - syringoyl) - reserpate,
ethyl 18-epi-O-(3,4,5-trimethoxy-cinnamoyl)-reserpate,
n-propyl 18-epi-O-(4-methyl-benzoyl)-reserpate,
n-propyl 18-epi-O-(3,4,5-trimethoxy-benzoyl)-reserpate,
isopropyl 18-epi-O-(3,4,5-trimethoxy-benzoyl)-reserpate,
isopropyl 18-epi-O-(O-ethoxycarbonyl - vanilloyl) - reserpate,
n-butyl 18-epi-O-(3,4,5-trimethoxy-benzoyl)-reserpate,
n-butyl 18-epi-O-(3-N,N-dimethylamino-benzoyl) - reserpate,
isobutyl 18-epi-O-(3,4,5-trimethoxy-benzoyl)-reserpate,
n-pentyl 18-epi-O-(3,4-dimethoxy-benzoyl)-reserpate,
n-hexyl 18-epi-O-nicotinoyl-reserpate,
methyl 18-epi-O-acetyl-9-methoxy-deserpidate,
methyl 9-methoxy-18-epi-O-(3,4,5-trimethoxy - benzoyl)-deserpidate,
methyl 18-epi-O-(O-ethoxycarbonyl-syringoyl) - 9-methoxy-deserpidate,
methyl 9-methoxy-18-epi-O-n-butyroyl-deserpidate,
ethyl 9-methoxy-18-epi-O-(3,4,5 - trimethoxy - benzoyl)-deserpidate,
methyl 18-epi-O-(4-acetoxy-benzoyl)-10-methoxy-deserpidate,
methyl 10-methoxy-18-epi-O-(3,4,5-trimethoxy-benzoyl)-deserpidate,
methyl 18-epi-O-isonicotinoyl-10-methoxy-deserpidate,
methyl 18-O-(2-furoyl)-10-methoxy-deserpidate,
ethyl 10-methoxy-18-epi-O-(3,4,5-trimethoxy - benzoyl)-deserpidate,
n-propyl 18-epi-O-(3,4-dichloro-benzoyl) - 10 - methoxy-deserpidate,
isopropyl 10-methoxy-18-epi-O-(3,4,5-trimethoxy,benzoyl)-deserpidate,
methyl 18-epi-O-acetyl-10-ethoxy-deserpidate,
methyl 10-ethoxy-18-epi-O-nicotinoyl-deserpidate,
methyl 11-ethoxy-18-epi-O-cinnamoyl-deserpidate,
methyl 11-ethoxy-18-epi-O-(4-nitro-benzoyl)-deserpidate,
methyl 11-ethoxy-18-epi-O-(3,4,5-trimethoxy - benzoyl)-deserpidate, methyl 18-epi-O-(4-ethoxy-carbonyloxy-benzoyl)-11-n-propyloxy-deserpidate,
methyl 18-epi-O-piperonyloyl-11-n-propyloxy-deserpidate,
methyl 18-epi-O-ethoxycarbonyl-11-n-propyloxy-deserpidate,
methyl 11-isopropyloxy-18-epi-O-(4-methoxy-3,5-dimethyl-benzoyl)-deserpidate,
ethyl 11-isopropyloxy-18-epi-(3,4,5-trimethoxy-benzoyl)-deserpidate,
methyl 11-n-butyloxy-18-epi-O-(4-N-ethoxycarbonyl-amino-benzoyl)-deserpidate,
methyl 11-n-butyloxy-18-epi-O-(2-methoxy-2-phenyl-acetyl)-deserpidate,
methyl 11-n-butyloxy-18-epi-O-(phenoxy-acetyl)-deserpidate,
methyl 18-epi-O-acetyl-12-methoxy-deserpidate,
methyl 12-methoxy-18-epi-O-(3,4,5-trimethoxy-benzoyl)-deserpidate,
ethyl 12-methoxy-18-epi-O-phenylacetyl-deserpidate,
methyl 18-epi-O-acetyl-deserpidate,
methyl 18-epi-O-propionyl-deserpidate,
methyl 18-epi-O-pivaloyl-deserpidate,
methyl 18-epi-O-(3,4-dimethoxy-benzoyl)-deserpidate,
methyl 18-epi-O-(3,4,5-trimethoxy-cinnamoyl)-deserpidate,
methyl 18-epi-O-(O-ethoxycarbonyl-syringoyl)-deserpidate,
methyl 18-epi-O-(O-methoxycarbonyl-feruloyl)-deserpidate,
methyl 18-epi-O-nicotinoyl-deserpidate,
methyl 18-epi-O-(4-hydroxy-benzoyl)-deserpidate,
ethyl 18-epi-O-(3,4,5-trimethoxy-benzoyl)-deserpidate,
ethyl 18-epi-O-(4-trifluoromethyl-benzoyl)-deserpidate,
ethyl 18-epi-O-(3-nitro-benzoyl)-deserpidate,
n-propyl 18-epi-O-(4-bromo-benzoyl)-deserpidate,
n-propyl 18-epi-O-(O-ethoxy-carbonyl-syringoyl)-deserpidate,
isopropyl 18-epi-O-(3,4,5-trimethoxy-cinnamoyl)-deserpidate,
isopropyl 18-epi-O-(3,4,5-trimethoxy-benzoyl)-deserpidate,
n-butyl 18-epi-O-acetyl-deserpidate,
secondary butyl 18-epi-O-(3,4,5-trimethoxy-benzoyl)-deserpidate,
n-pentyl 18-epi-O-(3-N,N-dimethylamino-benzoyl)-deserpidate,
methyl 18-epi-O-(4-ethoxy-carbonyloxy-benzoyl)-5-methyl-reserpate,
methyl 5-methyl-18-epi-O-(3,4,5-trimethoxy-benzoyl)-reserpate,
methyl 5-methyl-18-epi-O-benzoyl-reserpate,
ethyl 5-methyl-18-epi-O-(3,4,5-trimethoxy-benzoyl)-reserpate,
methyl 18-epi-O-acetyl-6-methyl-reserpate,
methyl 6-methyl-18-epi-O-(3,4,5-trimethoxy-cinnamoyl)-reserpate,
methyl 18-epi-O-(4-fluoro-benzoyl)-6-methyl-deserpidate,
methyl 6-methyl-18-epi-O-(3,4,5-trimethoxy-benzoyl)-deserpidate,
ethyl 6-methyl-18-epi-O-(4-nitro-benzoyl)-deserpidate,
methyl 18-epi-O-(2,5-dibromo-benzoyl)-9-methyl-deserpidate,
methyl 9-methyl-18-epi-O-(3,4,5-trimethoxy-benzoyl)-deserpidate,
methyl 9-methyl-18-epi-O-vanilloyl-deserpidate,
n-propyl 9-methyl-18-epi-O-(3,4,5-trimethoxy-benzoyl)-deserpidate,
methyl 18-epi-O-acetyl-10-methyl-deserpidate,
ethyl 10-methyl-18-epi-O-propionyl-deserpidate,
methyl 18-epi-O-(O-ethoxycarbonyl-syringoyl)-11-methyl-deserpidate,
methyl 11-methyl-18-epi-O-(3,4,5-trimethoxy-cinnamoyl)-deserpidate,
ethyl 11-methyl-18-epi-O-nicotinoyl-deserpidate,
methyl 18-epi-O-(3,4-dimethoxy-benzoyl)-10-methoxy-reserpate,
methyl 10-methoxy-18-epi-O-(3,4,5-trimethoxy-benzoyl)-reserpate,
methyl 18-epi-O-(O-ethoxy-carbonyl-feruloyl)-10-methoxy-reserpate,
ethyl 10-methoxy-18-epi-O-(3-methoxy-benzoyl)-reserpate,
methyl 18-epi-O-acetyl-9,10-dimethoxy-reserpate,
ethyl 9,10-dimethoxy-18-epi-O-nicotinoyl-reserpate,
methyl 18-epi-O-(4-chloro-benzoyl)-10,11-methylenedioxy-deserpidate,
methyl 18-epi-O-(3-N,N-dimethylamino-benzoyl)-10,11-methylenedioxy-deserpidate,
ethyl 18-epi-O-(3,4-dimethoxy-benzoyl)-10,11-methylenedioxy-deserpidate,
methyl 10-benzyloxy-18-epi-O-(3,4,5-trimethoxy-benzoyl)-deserpidate,
methyl 10-benzyloxy-18-epi-O-isonicotinoyl-deserpidate,
methyl 10-benzyloxy-18-epi-O-(4-nitro-benzoyl)-deserpidate,
ethyl 10-benzyloxy-18-epi-O-(2-methyl-benzoyl)-deserpidate,
methyl 11-benzyloxy-18-epi-O-propionyl-deserpidate,
methyl 11-benzyloxy-18-epi-O-(3,4,5-trimethoxy-benzoyl)-deserpidate,
methyl 11-benzyloxy-18-epi-O-(4-methoxy-benzoyl)-deserpidate,
methyl 18-epi-O-(3,4-di-chloro-benzoyl)-11-methyl-mercapto-deserpidate,
methyl 18-epi-O-diphenylacetyl-11-methyl-mercapto-deserpidate,
methyl 11-methylmercapto-18-epi-O-(3,4,5-trimethoxy-benzoyl)-deserpidate,
ethyl 11-methylmercapto-18-epi-O-(4-nitro-benzoyl)-deserpidate,
methyl 11-ethylmercapto-18-epi-O-(O-methoxycarbonyl-syringoyl)-deserpidate,
methyl 11-ethylmercapto-18-epi-O-(3,4,5-trimethoxy-benzoyl)-deserpidate,
ethyl 18-epi-O-(O-ethoxycarbonyl-feruloyl)-11-ethyl-mercapto-deserpidate,
n-propyl 11-ethylmercapto-18-epi-O-(3,4,5-trimethoxy-cinnamoyl)-deserpidate,
methyl 10-chloro-18-epi-O-(3,4-dichloro-benzoyl)-deserpidate,
methyl 10-chloro-18-epi-O-(3-ethyl-benzoyl)-deserpidate,
methyl 10-chloro-18-epi-O-(3,4,5-trimethoxy-benzoyl)-deserpidate,
ethyl 10-chloro-18-epi-O-isovaleroyl-deserpidate,
methyl 18-epi-O-acetyl-9,12-dichloro-deserpidate,
methyl 9,12-dichloro-18-epi-O-(3,4,5-trimethoxy-benzoyl)-deserpidate,
methyl 11,12-dichloro-18-epi-O-propionyl-deserpidate,
methyl 10-bromo-18-epi-O-(3,4,5-trimethoxy-benzoyl)-reserpate,
methyl 10-bromo-18-epi-O-(4-ethoxycarbonyl-benzoyl)-reserpate,
methyl 10-bromo-18-epi-O-cinnamoyl-reserpate,
ethyl 10-bromo-18-epi-O-(4-N,N-dimethylamino-benzoyl)-reserpate,
methyl 18-epi-O-acetyl-11-fluoro-deserpidate,
methyl 11-fluoro-18-epi-O-(3,4,5-trimethoxy-benzoyl)-deserpidate,
methyl 17α-desmethoxy-17α-ethoxy-18-epi-O-(3,4,5-trimethoxy-benzoyl)-reserpate,
methyl 17α-desmethoxy-17α-ethoxy-18-epi-O-(3-fluoro-benzoyl)-reserpate,
methyl 17α-desmethoxy-17α-ethoxy-18-epi-O-(ethoxycarbonyl-vanilloy-reserpate,
methyl 17α-desmethoxy-18-epi-O-(4-methoxy-benzoyl)-17α-n-propyloxy-reserpate,
methyl 17α-desmethoxy-18-epi-O-isonicotinoyl-17α-n-propyloxy-reserpate, ethyl 17α-desmethoxy-17α-n-propyloxy-18 - epi-O-(3,4,5-trimethoxy-benzoyl)-reserpate, methyl 17α - desmethoxy - 17α - isopropyloxy - 18 - epi-O-(3,4,5-trimethoxy-cinnamoyl)-reserpate, methyl 17α-desmethoxy-17α-isopropyloxy - 18 - epi-O-(3-methyl-benzoyl)-reserpate, methyl 17α-desmethoxy-18-epi-O-(4-ethoxycarbonylamino-benzoyl)-17α-isopropyloxy-reserpate, methyl 17α-desmethoxy-17α-ethoxy-18 - epi - O-(3,4,5-trimethoxy-benzoyl)-deserpidate, methyl 17α-desmethoxy-17α-ethoxy-18 - epi-O-propionyl-deserpidate, methyl 18-epi-O-(4-N-acetylamino - benzoyl) - 17α - desmethoxy-17α-ethoxy-deserpidate, ethyl 17α-desmethoxy-17α-ethoxy-18-epi - O - (3,4,5 - trimethoxy-benzoyl)-deserpidate, methyl 18-epi-O-acetyl-17α-cyano-17α-desmethoxy-reserpate, methyl 17α-cyano-17α-desmethoxy-18-epi-O-(3 - N,N-dimethylamino-benzoyl)-reserpate, methyl 17α-cyano-17α-desmethoxy - 18-epi-O-nicotinoyl-deserpidate, ethyl 17α-cyano-17α-desmethoxy-18-epi-O-propionyl - deserpidate, 2-methoxyethyl 18-epi-O-acetyl-reserpate and the like, and acid addition, particularly mineral acid addition salts of such compounds.

*Example 6*

A mixture of 1.0 g. of methyl 18-epi-reserpate hydrochloride, 14 ml. of a 1 N aqueous sodium hydroxide solution, 43 ml. of methanol and 7.2 ml. of water is refluxed for 1½ hours and is then cooled and concentrated under reduced pressure to a volume of 16 ml. To this is added 5 ml. of concentrated hydrochloric acid and ethanol; the solution is re-evaporated to a small volume, acetone is added and again concentrated to a small volume, 0.96 g. of a crystalline material, which is recrystallized from an acetone-water mixture and several times from a methylene chloride-methanol mixture to yield 0.34 g. of 18-epi-reserpic acid hydrochloride containing about one-half mol of water, M.P. 243–252°, $[\alpha]_D^{24}=-36°$ (chloroform-methanol).

*Example 7*

A mixture of 2.75 g. of methyl 18-O-(4-bromo-phenyl-sulfonyl)-deserpidate, 0.57 g. of N,N,N-triethylamine, 71 ml. of dioxane and 24 ml. of water is refluxed in an atmosphere of nitrogen for six days. The solvents are evaporated under reduced pressure, the remaining sticky solid is taken up in 5 percent aqueous hydrochloric acid, the insoluble material is fitered off and discarded. The filtrate is made basic with aqueous ammonia; the precipitate is filtered off, washed with water and dried. The desired methyl 18-epi-deserpidate is crystallized from diethyl ether, M.P. 139–143°; $[\alpha]_D^{26}=-103°$ (chloroform); yield: 1.45 g.

The starting material may be prepared as follows: A mixture of 5.67 g. of methyl deserpidate and 9.6 g. of 4-bromo-benzene sulfonyl chloride in 80 ml. of dry pyridine is allowed to stand at room temperature and in the dark for two days and is then poured into ice-water. The organic material is extracted with chloroform, the organic solution is washed with a 5 percent aqueous sodium carbonate solution, twice with water and with a saturated aqueous sodium chloride solution, and is then dried over sodium sulfate and evaporated to dryness.

The residue is crystallized from a mixture of benzene and methylene chloride by evaporating the methylene chloride to yield methyl 18-O-(4-bromo-phenyl-sulfonyl)-deserpidate, M.P. 198–200°, $[\alpha]_D^{26}=-90°$ (chloroform); yield: 5.0 g.

*Example 8*

A mixture of 1.0 g. of methyl 18-epi-deserpidate, 0.7 g. of 3,4,5-trimethoxy-benzoyl chloride and 25 ml of dry pyridine is allowed to stand at room temperature overnight and is then poured into ice-cold water. The solution is made basic with aqueous ammonia; the insoluble material is filtered off, the sticky solid is washed with water and taken up in methylene chloride and filtered through a column containing a diatomaceous earth preparation. The filtrate is evaporated to drynes, the residue is dissolved in acetone and treated with methanolic hydrogen chloride. The solution is taken to dryness to yield methyl 18 - epi-O-(3,4,5-trimethoxy-benzoyl)-deserpidate hydrochloride (or 18-epi-deserpidine hydrochloride), which melts at 230–233° after crystallization from methanol; yield: 0.2 g.

The methyl 18-epi-O-(3,4,5-trimethoxy-benzoyl)-deserpidate hydrochloride is dissolved in water, the solution is made basic with aqueous ammonia and extracted with methylene chloride. The organic solution is dried over sodium sulfate and evaporated to dryness; the residue is dissolved in diethylether, to which is added an excess of petroleum ether to precipitate the desired methyl 18-epi-O-(3,4,5-trimethoxy-benzoyl)-deserpidate (18-epi-deserpidine), M.P. 125–123° (with foaming), $[\alpha]_D^{25}=8°$ (in chloroform); yield: 0.12 g.

*Example 9*

A mixture of 1.0 g. of methyl 18-epi-reserpate and 7.1 ml. of acetic acid anhydride in 21 ml. of pyridine is allowed to stand at room temperature for two days and is then poured into a large volume of water. The solution is made basic with aqueous ammonia, the solid material is filtered off and twice recrystallized from acetone to yield 0.48 g. of methyl 18-epi-O-acetyl-reserpate, M.P. 245–247° (with foaming); $[\alpha]_D^{26}=-18°$ (in chloroform).

*Example 10*

A solution of 1.0 g. of methyl 18-epi-reserpate and 0.84 g. of O-ethoxycarbonyl-syringoyl chloride in 15 ml. of dry pyridine is allowed to stand in a stoppered, foil-covered flask at room temperature overnight and is then poured into ice-water. The pH is adjusted to 7 by adding a drop of aqueous ammonia. The solid material is filtered off after a brief standing, is washed with water and is recrystallized twice from ethanol to yield a total of 0.6 g. of a methyl 18-epi-O-(O-ethoxycarbonyl-syringoyl)-reserpate (or 18-epi-syrosingopine), M.P. 183–185° (first crop); $[\alpha]_D^{26}=+38.95$ (in chloroform).

*Example 11*

A solution of 0.3 g. of 18-epi-reserpic acid hydrochloride in 25 ml. of a mixture of methylene chloride and methanol is treated in the cold with an excess of a solution of diazomethane in diethylether. After standing for several hours, the excess of diazomethane is destroyed by adding a small amount of acetic acid, and the solution is then evaporated under reduced pressure. The residue is dissolved in methylene chloride; the organic solution is washed twice with a five percent aqueous solution of sodium carbonate and once with a saturated aqueous sodium chloride solution, dried and filtered through a short column containing a diatomaceous earth preparation. The filtrate is evaporated under reduced pressure and the crude methyl 18-epi-reserpate is recrystallized from acetonitrile and is identical with the product described in Example 1.

In the above procedure, diazomethane may be replaced by other lower diazo-alkanes, e.g. diazoethane, diazo-n-propane and the like, or substituted lower diazo-alkanes, e.g. 2-methoxy-diazoethane, 2-N,N-dimethylamino-diazoethane and the like; upon treating 18-epi-reserpic acid hydrochloride with these diazo-compounds other lower alkyl 18-epi-reserpates, e.g. ethyl 18-epi-reserpate, n-propyl 18-epi-reserpate, and the like, or substituted lower alkyl 18-epi-reserpates, e.g. 2-methoxy-ethyl 18-epi-O-reserpate, N,N-dimethylaminoethyl 18-epi-O-reserpate, N,N-dimethylaminoethyl 18-epi-reserpate and the like, can be prepared.

Example 12

A mixture of 5.0 g. of 2-methoxyethyl 18-O-(3-nitrophenyl-sulfonyl)-reserpate, 1.2 g. of N,N,N-triethylamine and 40 ml. of water in 118 ml. of p-dioxane is refluxed gently under an atmosphere of nitrogen for five days. The solvents are evaporated, the residue is dissolved in 200 ml. of 5 percent aqueous hydrochloric acid, and the acid solution is treated with aqueous ammonia. The resulting precipitate is filtered off, washed with water, dried and crystallized from ethyl acetate. The desired 2-methoxyethyl 18-epi-reserpate is recrystallized from ethyl acetate, M.P. 168–170°, $[\alpha]_D^{24} = -69°$ (chloroform).

The free base is converted into its hydrochloride by lyophylizing a solution of 0.7 g. of 2-methoxyethyl 18-epi-reserpate, 1.8 ml. of 1 N hydrochloric acid and 15 ml. of water; the residue is dried under reduced pressure and at room temperature to yield the 2-methoxyethyl 18-epi-reserpate hydrochloride sesquihydrate M.P. 182–188°.

The starting material may be prepared as follows: To a mixture of a 33 percent aqueous solution of 2-methoxyethylamine and 150 ml. of diethyl ether, kept at 5° to 10° in an ice bath, is added dropwise at 54 g. of ethyl chloroformate. 100 g. of a cold 40 percent aqueous solution of sodium hydroxide and a second portion of 54 g. of ethyl chloroformate are given to the mixture, which is stirred for one hour. The ether layer is separated, the aqueous phase is extracted with 100 ml. of diethyl ether, and the two ether solutions are combined and dried over potassium carbonate. The solvent is evaporated under reduced pressure and the ethyl N-(2-methoxyethyl)-carbamate is distilled at 105–106°/17 to 20 mm.

To a solution of 33 g. of ethyl N-(2-methoxyethyl)-carbamate in 200 ml. of diethyl ether are added 25 g. of cracked ice and a solution of 81 g. of sodium nitrite in 125 ml. of water. While keeping the temperature below 15°, 150 g. of 35 percent aqueous nitric acid is added carefully and over a period of one hour. The ether layer is separated, washed with water and aqueous potassium carbonate and then dried over potassum carbonate. The residue obtained after evaporation of the solvent under reduced pressure, represents the ethyl N-(2-methoxyethyl)-N-nitroso-carbamate, which is used without further purification.

A gently refluxing solution of 5 g. of potassium hydroxide in 15 g. of methanol and 150 ml. of diethyl ether is treated with a solution of 15.5 g. of ethyl N-(2-methoxyethyl)-N-nitroso-carbamate in 50 ml. of diethylether, which is added dropwise over a period of one hour. After refluxing for 5 minutes, 100 ml. of water is added and the yellow ether solution, containing the 2-methoxy-diazoethane, is prepared.

The above ether solution of 2-methoxy-diazoethane is reacted with small portions of a slurry of reserpic acid in methanol until no further reaction can be observed. A few drops of acetic acid are added, the solution is evaporated under reduced pressure and the residual oil is dissolved in ethyl acetate. Upon addition of petroleum ether a precipitate is formed, which is filtered off, dissolved in methylene chloride, which solution is washed with aqueous ammonia and filtered through a small column containing a diatomaceous earth. The residue, obtained after evaporation of the solvent, is crystallized from ethyl acetate to yield the 2-methoxyethyl reserpate, M.P. 183–185°.

A mixture of 9.6 g. of 2-methoxyethyl reserpate, 6.0 g. of 3-nitro-benzene sulfonic acid chloride and 15 ml. of pyridine is prepared at 0°, and is allowed to stand at 5° overnight and at room temperature for three hours. The reaction mixture is poured into 600 ml. of water containing 4.5 ml. of N,N,N-triethylamine and 10 ml. of aqueous ammonia. The granular solid is filtered off, washed with water and dissolved in methylene chloride. The organic solution is filtered through a column containing a diatomaceous earth preparation, the solvent is evaporated, and the residue is dissolved in a small amount of methylene chloride. The 2-methoxyethyl 18-O-(3-nitro-phenyl-sulfonyl)-reserpate crystallizes upon concentrating the solution until crystallization begins and then adding a 50 percent excess of diethyl ether and is purified by washing with diethyl ether, M.P. 152–156°.

Other lower alkoxy-lower alkyl 18-epi-reserpates, in which lower alkyl separates lower alkoxy from the 16β-carboxyl group by from two to three carbon atoms, are, for example, 2-ethoxyethyl 18-epi-reserpate, 2-methoxypropyl 18-epi-reserpate 3-methoxypropyl-18-epi-reserpate, and the like, lower alkoxy-lower alkyl 18-epi-deserpidates, in which lower alkyl separates lower alkoxy from the 16β-carboxyl group by from two to three carbon atoms, are, for example, 2-methoxyethyl 18-epi-deserpidate, 2-ethoxyethyl 18-epi-deserpidate and the like, or acid addition, particularly mineral acid addition salts; these compounds are prepared according to the previously-described procedure.

As shown hereinbefore, the above 18α-hydroxy-3-epi-allo-yohimbane 16β-carboxylic acid lower alkoxy-lower alkyl esters, in which lower alkyl separates lower alkoxy from the 16β-carboxyl group by at least two carbon atoms, may also be prepared by eliminating in a Δ³-18α-hydroxy-allo-yohimbane 16β-carboxylic acid lower alkoxy-lower alkyl ester, in which lower alkyl separates lower alkoxy from the 16b-carboxyl group by at least two carbon atoms, or a salt thereof, the double bond extending from the 3-position. The removal of the double bond may be carried out, for example, by reacting the starting material, preferably a salt thereof, such as the perchlorate and the like, with zinc in the presence of aqueous perchloric acid and of an inert solvent or solvent mixture.

The starting materials used in the above reduction procedure, i.e. the Δ³-18α-hydroxy-allo-yohimbene 16β-carboxylic acid lower alkoxy-lower alkyl ester, in which lower alkyl separates lower alkoxy from the 16β-carboxyl group by at least two carbon atoms, or salts thereof, are new and are intended to be included within the scope of this invention. In the compounds of this specific group, the double bond extends from the 3-position to the 14-position, whenever they are in the form of the free base or are in solution in a weakly polar to non-polar solvent; the double bond extends from the 3-position to the 4-position, whenever the free base is dissolved in a more polar solvent or whenever the compounds are in the form of salts thereof. The latter, particularly the pharmaceutically acceptable salts, are especially those, in which the anion is derived from an inorganic acid, such as, for example, hydrochloric, hydrobromic, sulfuric, perchloric acid and the like, as well as from an organic carboxylic acid, e.g. acetic acid and the like, or an organic sulfonic acid, e.g. p-toluene sulfonic acid.

We have found that these compounds have strong antifibrillatory effects and can be used to overcome cardiac irregularities, such as extrasystoles, auricular fibrillation and the like, for example, the cardiac irregularities caused by aconitine. These compounds may be used in the form of pharmaceutical preparations, such as those previously-described.

The Δ³-18α-hydroxy-allo-yohimbene 16β-carboxylic acid lower alkoxy-lower alkyl ester compounds or salts thereof, may be represented by the formula:

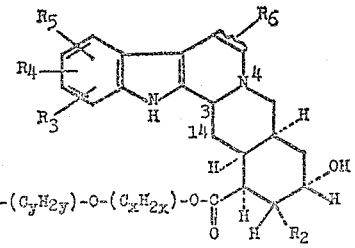

in which $R_2$, $R_3$, $R_4$, $R_5$ and $R_6$ has the previously-given meaning, the letter $x$ stands for a whole number from two to three, the letter $y$ stands for a whole number from one to four, and the group of the formula —$(C_xH_{2x})$— separates the two oxygen atoms by two to three carbon atoms, and in which a double bond extends from the 3-position, or salts thereof.

Compounds of the above type are primarily the lower alkoxy-lower alkyl 3-dehydro-18-epi-reserpates, in which lower alkyl separates lower alkoxy from the 16β-carboxyl group by from two to three carbon atoms, such as 2-lower alkoxy-ethyl 3-dehydro-18-epi-reserpates, e.g. 2-methoxyethyl 3-dehydro-18-epi-reserpate, 2-ethoxyethyl 3-dehydro-18-epi-reserpate, 2-n-propyloxyethyl 3-dehydro-18-epi-reserpate, 2-isopropyloxyethyl 3-dehydro-18-epi-reserpate and the like, 2-lower alkoxy-propyl 3-dehydro-18-epi-reserpates, e.g. 2-methoxypropyl 3-dehydro-18-epi-reserpate, 2-ethoxypropyl 3-dehydro-18-epi-reserpate and the like, 3-lower alkoxy-propyl 3-dehydro-18-epi-reserpates, e.g. 3-methoxypropyl 3-dehydro-18-epi-reserpate, 3-ethoxypropyl 3-dehydro-18-epi-reserpate and the like, or the pharmaceutically acceptable salts thereof, particularly the halides, e.g. chlorides, bromides and the like, thereof. Other compounds of this group are the lower alkoxy-lower alkyl 3-dehydro-18-epi-deserpidates, in which lower alkyl separates lower alkoxy from the 16β-carboxyl group by from two to three carbon atoms, such as 2-lower alkoxy-ethyl 3-dehydro-18-epi-deserpidates, e.g. 2-methoxyethyl 3-dehydro-18-epi-deserpidate, 2-ethoxyethyl 3-dehydro-18-epi-deserpidate and the like, 2-lower alkoxy-propyl 3-dehydro-18-epi-deserpidates, e.g. 2-methoxypropyl 3-dehydro-18-epi-deserpidate and the like, 3-lower alkoxy-propyl 3-dehydro-18-epi-deserpidate, e.g. 3-methoxypropyl 3-dehydro-18-epi-deserpidate and the like, or the lower alkoxy-lower alkyl 10-methoxy-3-dehydro-18-epi-deserpidates, in which lower alkyl separates lower alkoxy from the 16β-carboxyl group by from two to three carbon atoms, such as 2-lower alkoxy-ethyl 10-methoxy-3-dehydro-18-epi-deserpidates, e.g. 2-methoxyethyl 10-methoxy-3-dehydro-18-epi - deserpidate and the like, 2-lower alkoxypropyl 10-methoxy-3-dehydro-18-epi-deserpidates, e.g. 2-methoxypropyl 10-methoxy-3-dehydro-18-epi-deserpidate and the like, 3-lower alkoxypropyl 10-methoxy-3-dehydro-18-epi-deserpidates, e.g. 3-methoxypropyl 10-methoxy-3-dehydro-18-epi - deserpidate and the like, or the pharmaceutically acceptable salts thereof, such as the halides, e.g. chlorides, bromides and the like.

The above described Δ³-18α-hydroxy-allo-yohimbene 16β-carboxylic acid lower alkoxy-lower alkyl esters or salts thereof may be prepared according to known methods, for example, by introducing a double bond into the 3-position of an 18α-hydroxy-allo-yohimbane 16β-carboxylic acid lower alkoxy-lower alkyl ester compound, in which lower alkyl separates lower alkoxy from the 16β-carboxyl group by at least two carbon atoms, or a salt thereof, and, if desired, converting a resulting salt into the free compound, and/or, if desired, converting a resulting compound into a salt thereof.

The hydrogen atom attached to the 3-position of the starting material may have either the α-configuration or the β-configuration; the starting material may, therefore, be of the allo-yohimbane or the 3-epi-allo-yohimbane series. Salts of the starting material are primarily acid addition salts, such as, for example, those with inorganic acids, e.g. hydrochloric, sulfuric, perchloric acid and the like.

The introduction of a double bond extending from the 3-position may be carried out, for example, by treatment of the starting material with mercuric acetate according to the method described by Weisenborn et al., J. Am. Chem. Soc., vol. 78, p. 2022 (1956), or with tertiary butyl hypochlorite according to the procedure described by Gottfredsen et al., Acta Chem. Scand., vol. 10, p. 1414 (1956), or with palladium black in the presence of acetic acid, as described in United States Patent No. 2,957,000.

We prefer to introduce the double bond into the 3-position of an 18α-hydroxy-allo-yohimbane 16β-carboxylic acid lower alkoxy-lower alkyl ester compound by treatment with an oxidation reagent containing hexavalent chromium. Such reagent is, for example, a salt of chromic acid, such as an alkali metal dichromate, particularly potassium dichromate and the like, as well as ammonium dichromate, or any other analogous salt containing the hexavalent chromium. Also useful as such oxidation reagent is chromic anhydride or any other suitable, analogous oxidation reagent of the above type. These reagents are advantageously used in the presence of an acid, especially acetic acid and the like, which may also serve as a diluent. The reaction is carried out in an aqueous medium, preferably in a mixture of water and water-miscible organic solvents. The latter are diluents, which are not oxidized by the oxidation reagent; suitable solvents are, for example, tetrahydrofuran, p-dioxane, acetone and the like, but preferably acetic acid. The latter, when used as a diluent may also serve as an acidic reagent which may be required whenever the oxidation reagent is used in an unreactive form. The reaction is carried out at room temperature, if necessary, while cooling. The oxidative introduction of the double bond into the 3-position of the starting material by treatment with an oxidation reagent containing hexavalent chromium is carried out at room temperature using a salt of chromic acid, such as an alkali metal dichromate, especially potassium dichromate, as the oxidation reagent, in a mixture of water and a water-miscible organic solvent, especially in aqueous acetic acid.

The 3-dehydro-compound resulting from the above procedure is preferably isolated by neutralizing or basifying the reaction mixture, thus converting a resulting salt formed in the acidic reaction medium into the free base. Any water-soluble alkaline reagent may be used for that purpose; especially convenient is ammonia in the form of a concentrated aqueous solution thereof. Upon basifying the reaction mixture, the desired compound may precipitate and be filtered off, or it may be extracted from the aqueous medium into an organic, sparingly water-miscible solvent, e.g. methylene chloride, chloroform, diethyl ether and the like, and thus be separated from the reaction mixture.

The starting materials used in the above procedure are known or may be prepared according to known methods. Compounds of the 18α-hydroxy-allo-yohimbane 16β-carboxylic acid lower alkoxy-lower alkyl ester series used as starting materials may be obtained, for example, by isomerization of an 18α-hydroxy-3-epi-allo-yohimbane 16β-carboxylic acid lower alkoxy-lower alkyl ester in an acidic medium and isolating the desired allo-yohimbane compound; such isomerization procedure has been described hereinbefore.

The Δ³-18α-hydroxy-allo-yohimbene 16β-carboxylic acid lower alkoxy-lower alkyl ester compounds or salts thereof may also be prepared by hydrolizing in a Δ³-18α-esterified hydroxy-allo-yohimbene 16β-carboxylic acid lower alkoxy-lower alkyl ester or a salt thereof, the 18α-esterified hydroxyl group, and, if desired, converting a resulting compound into a salt thereof.

Hydrolysis of the 18α-esterified hydroxyl group, in which the hydroxyl group is esterified by an organic acid, particularly an organic carboxylic acid, such as by one of the previously-described carboxylic acids, for example, acetic, benzoic, 3,4,5-trimethoxy-benzoic acid and the like, is carried out according to known methods, for example, by treatment with an alkaline reagent. In view of the fact that hydrolysis of the 16β-carboxylic acid lower alkoxy-lower alkyl ester group has to be avoided, hydrolysis of the 18α-esterified hydroxyl group is preferably carried out by treatment with an alkaline transesterification reagent, such as by treatment with an alkali metal lower alkoxy-lower alkanolate, e.g. sodium or potassium 2-methoxyethanolate, 2-ethoxyethanolate, 2-methoxypropanolate, 3-methoxypropanolate and the like, in the presence of the corresponding lower alkoxy-lower alkanol, e.g. 2-methoxyethanol, 2-ethoxyethanol, 2-methoxypropanol, 3-methoxypropanol and the like, which may also serve as a diluent; additional inert solvents, such as p-dioxane and the like, may serve as further diluents. If necessary, hydrolysis is completed at an elevated temperature, in a closed vessel and/or in the atmosphere of an inert gas, e.g. nitrogen. The starting material used in the above reaction is prepared according to previously-described method.

The $\Delta^3$-18$\alpha$-hydroxy-allo-yohimbene 16$\beta$ - carboxylic acid lower alkoxy-lower alkyl ester compounds and salts thereof, may also be prepared by hydrolizing in a $\Delta^3$-18$\beta$-organic sulfonyloxy-allo-yohimbene 16$\beta$-carboxylic acid lower alkoxy-lower alkyl ester compoound or a salt thereof, the 18$\beta$-organic sulfonyloxy group by treatment with water, and, if desired, carrying out the optional steps.

An 18$\beta$-organic sulfonyloxy group, in which the hydroxyl group is esterified by an organic sulfonic acid, such as a lower alkane sulfonic acid, or, more especially, a monocyclic carbocyclic aryl sulfonic acid, such as the organic sulfonic acids described hereinbefore, is hydrolized by treatment with water, preferably in the presence of an organic base, e.g. N,N,N-triethylamine and the like, and, if necessary, in a closed vessel and/or in the atmosphere of an inert gas, e.g. nitrogen. Details of such hydroylsis which occurs with inversion, and of the preparation of the starting materials are given hereinbefore.

The preparation of the above-described $\Delta^3$-18$\alpha$-allo-yohimbene 16$\beta$-carboxylic acid lower alkoxy-lower alkyl ester compounds or salts thereof, may be illustrated by the following example:

To a solution of 2.0 g. of 2-methoxethyl 18-epi-reserpate in 40 ml. of acetic acid and 80 ml. of water is added 0.72 g. of potassium dichromate in 40 ml. of water. The reaction mixture is allowed to stand at room temperature for one hour, and is then diluted with water and made basic with aqueous ammonia. The organic material is extracted with methylene chloride, the extract is dried over sodium sulfate and evaporated to dryness. 1.9 g. of crude 2-methoxyethyl 3-dehydro-18-epi-reserpate of the formula:

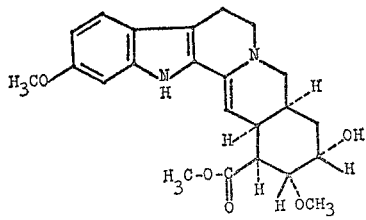

is recovered, crystallized from methanol and recrystallized from a mixture of methanol and petroleum ether to give the hemihydrate, M.P. 170–174°; $[\alpha]_D^{25°}=+125°$ (in chloroform).

The solvent from a solution of 0.275 g. of 2-methoxyethyl 3-dehydro-18-epi-reserpate and 0.66 ml. of 1 N aqueous hydrochloric acid in 15 ml. of water is removed by lyophylization; the desired 2-methoxyethyl 3-dehydro-18-epi-reserpate chloride is dried to contain 2½ mols of water, M.P. 62–66°, yield: 0.275 g.

Other compounds, which may be prepared according to the above procedure, are for example, 2-ethoxyethyl 3-dehydro-18-epi-reserpate, 2-n-propyloxyethyl 3-dehydro-18-epi-reserpate, 2 - methoxypropyl 3 - dehydro-18-epi-reserpate, 3-methoxypropyl 3-dehydro-18-epi-reserpate, 2-methoxyethyl 3-dehydro-18-epi- deserpidate, 2-methoxyethyl 10-methoxy-3-dehydro - 18 - epi-deserpidate and the like, by choosing the appropriate starting materials.

*Example 13*

A mixture of 2.0 g. of ethyl 18-O-(4-bromo-phenyl-sulfonyl)-reserpate and 0.48 g. of N,N,N-triethylamine in 58 ml. of dioxane and 19 ml. of water is gently refluxed for seven days in an atmosphere of nitrogen. The solvents are evaporated under reduced pressure, and the residue is dissolved in 5 percent aqueous hydrochloric acid. The insoluble material is filtered off, the filtrate is made basic with aqueous ammonia, and the granular precipitate is recovered and dried. The desired ethyl 18-epi-reserpate melts at 194–197° after recrystallization from acetonitrile (yield: 1.0 g.) and drying for three hours at 125°; $[\alpha]_D^{23°}=-62°$ (chloroform).

The ethyl 18-epi-reserpate hydrochloride, M.P. 206–211°, is obtained by lyophylizing a solution of 0.7 g. of ethyl 18-epi-reserpate and 1.8 ml. of 1 N hydrochloric acid in 10 ml. of water; yield: 0.7 g.

The starting material may be prepared according to the precedure described in Example 1 by reacting 2.0 g. of ethyl reserpate with 3.0 g. of 4-bromo-benzene sulfonyl chloride in 20 ml. of dry pyridine; the ethyl 18-O-(4-bromo-phenyl-sulfonyl)-reserpate melts at 210–212°.

*Example 14*

A mixture of 0.65 g. of n-propyl 18-O-(4-bromo-phenyl-sulfonyl)-reserpate and 0.15 g. of N,N,N-triethylamine in 18 ml. of dioxane and 6 ml. of water is gently refluxed for five days in an atmosphere of nitrogen; the reaction mixture is worked up as shown in Example 13 to yield the n-propyl 18-epi-reserpate, which melts at 195–198° after crystallizing from methanol and drying for three hours at 130°, $[\alpha]_D^{25°}=-60°$ (in chloroform); yield: 0.3 g.

The n-propyl 18-epi-reserpate hydrochloride monohydrate, prepared by lyophylizing a solution of 0.125 g. of n-propyl 18-epi-reserpate and 0.33 ml. of 1 N hydrochloric acid in 5 ml. of water, melts at 196–203°; yield: 0.115 g.

The starting material used in the above procedure may be prepared by reacting 4.0 g. of n-propyl reserpate with 6.0 g. of 4-bromo-benzene sulfonyl chloride in 50 ml. of pyridine according to the method described in Example 1; the n-propyl 18-O-(4-bromo-phenyl-sulfonyl)-reserpate melts at 198–200°.

*Example 15*

A solution of 2.58 g. of methyl 18-epi-reserpate monohydrate in 700 ml. of methylene chloride is cooled to —10° and 90 ml. of an 0.1 M stock solution of fluoboric acid is added (the latter is prepared by concentrating commercial 50 percent fluoboric acid to a concentration of about 14 M and diluting the concentrate with the appropriate quantity of an 1:3-mixture of absolute diethyl ether and methylene chloride). The turbid solution is cooled to —12°, and 135 ml. of an 0.265 M solution of diazomethane in methylene chloride is added over a period of seven minutes while stirring. The reaction mixture is stirred for an additional 15 minutes, a small amount of glacial acetic acid is then added to destroy the excess of diazomethane, and the solution is then washed twice with 5 percent aqueous sodium carbonate and once with a saturated aqueous solution of sodium chloride. The organic layer is separated, dried over anhydrous sodium sulfate and evaporated under reduced pressure. The residue contains about 20 to 30 percent of the desired methyl 18 - epi - O - methyl reserpate. The R$f$-value of methyl 18-epi-O-methyl-reserpate on paper impregnated with a 1:1-mixture of formamide (adjusted to pH 5.6 with benzoic acid) and methanol, using chloroform as the mobile phase, is R$f$=0.45, with chloroform containing 10 percent pyridine as the mobile phase, R$f$=0.80, and with a 1:1-mixture of chloroform and benzene as the mobile phase, R$f$=0.15, as compared with R$f$=0.13, R$f$=0.55 and R$f$=0.04 in the respective systems for methyl 18-epi-reserpate used as the starting material. The pure methyl 18-epi-O-methyl-reserpate melts at 241–244°.

*Example 16*

To a solution of 1.2 g. of methyl 18-epi-reserpate in 400 ml. of methylene chloride is added 5 ml. of the stock fluoboric acid solution described in Example 15. The reaction mixture is kept at a temperature of about −10°, and a solution of an excess of n-diazobutane in methylene chloride is added. The reaction mixture is worked up as shown in Example 15 and the resulting methyl 18-epi-O-n-butyl-reserpate is obtained, which melts at 224–226° (decomposition).

Other lower alkyl 18-epi-O-lower alkyl-reserpates, such as methyl 18-epi-O-ethyl-reserpate, methyl 18-epi-O-n-propyl-reserpate, ethyl 18-epi-O-methyl-reserpate and the like, as well as other 18α-etherified hydroxy-3-epi-allo-yohimbane 16-carboxylic acid esters may be prepared according to the above procedure.

*Example 17*

A mixture of 0.64 g. of methyl 18-epi-O-(4-bromo-phenyl-sulfonyl)-reserpate and 50 ml. of methanol is heated at 100° in a sealed vessel for seven days. The solvent is evaporated, the residue is dissolved as completely as possible in methylene chloride, and the solid material is removed after shaking with a 5 percent aqueous solution of sodium carbonate. The organic solution is washed with saturated aqueous sodium chloride and then evaporated, the residue is taken up in methylene chloride, which solution is passed through a column containing a diatomaceous earth preparation. The column is eluted with methylene chloride and methylene chloride containing 5 percent methanol. The combined eluted product is recrystallized from a mixture of benzene and cycohexane. The first crystalline crop is discarded, the filtrate is concentrated to yield a small amount of slightly impure methyl 18-O-methyl-reserpate, M.P. 224–228°.

*Example 18*

A mixture of 1.0 g. of methyl 18-epi-O-(4-bromo-phenyl-sulfonyl)-reserpate in 80 ml. of methanol and 0.5 ml. of pyridine is heated for seven days in a sealed bottle on the steam bath. The solid material is filtered off, the filtrate is taken to dryness under reduced pressure, and the residue is dissolved in methylene chloride. The organic solution is washed twice with a five percent aqueous solution of sodium carbonate and with a saturated aqueous sodium chloride solution, then filtered through a diatomaceous earth preparation and evaporated. A benzene solution of the foamy residue is placed on a column containing 15 g. of aluminum oxide, the chromatogram is developed with benzene, methylene chloride and methanol. The methanol fraction is recrystallized from a mixture of 5 ml. of benzene and 15 ml. of cyclohexane, the mother liquors are concentrated and diluted with diethyl ether. A powder precipitates and is recrystallized from a small amount of 1:3-mixture of benzene and cyclohexane; the solid material is filtered off and washed with the same solvent mixture to yield methyl 18-O-methyl-reserapate, M.P. 225–230°;

$$[\alpha]_D^{25} = -101°$$

(chloroform). The product is identical in every respect with the compound obtained from the precedure described in Example 17.

By replacing in the above procedure methanol by another lower alkanol, e.g. ethanol, n-propanol, isopropanol and the like, other methyl 18-O-lower alkyl-reserpates, e.g. methyl 18-O-ethyl-reserpate, methyl 18-O-n-propyl-reserpate, methyl 18-O-isopropyl reserpate and the like, can be obtained.

*Example 19*

A slurry of 21.6 g. of methyl 18-epi-reserpate mono-hydrate in 54 ml. of dry pyridine is chilled in an ice-bath, and a total of 22.2 g. of 3-nitro-benzene sulfonyl chloride is added portionwise over a period of about 10 minutes. After flushing with nitrogen the flask is stoppered and allowed to stand at room temperature for 14 hours; the resulting slurry is added to 1500 ml. of ice-water and 200 ml. of methylene chloride and the two layers are separated. The aqueous layer is extracted twice with 100 ml. of methylene chloride; the combined organic solutions are washed twice with 200 ml. of water, once with 200 ml. and once with 100 ml. of a 5 percent aqueous sodium carbonate solution. The aqueous extracts are washed with methylene chloride, the organic solutions are combined, dried over sodium sulfate, treated with charcoal and evaporated to dryness. The residue is refluxed overnight with diethyl ether, the ether solution is cooled, the solid material is filtered off and washed with cold diethyl ether to yeld the desired methyl 18-epi-O-(3-nitro-phenyl-sulfonyl)-reserpate, which is purified by dissolving it in 180 ml. of methanol. The organic solution is allowed to stand overnight at room temperature, the solid material is filtered off and washed with methanol, M.P. 174–176°.

What is claimed is:

1. A member selected from the group consisting of a compound of the formula:

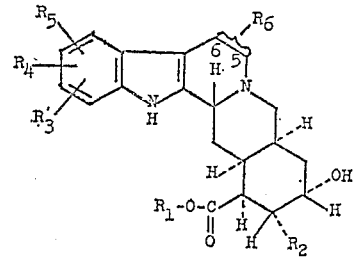

in which $R_1$ stands for a member selected from the group consisting of lower alkyl, phenyl-lower alkyl, lower alkoxy-lower alkyl, in which lower alkyl separates lower alkoxy from the carboxyl group by at least two carbon atoms, and N,N-di-lower alkyl-amino-lower alkyl, in which lower alkyl separates N,N-di-lower alkyl-amino from the carboxyl group by at least two carbon atoms, $R_2$ stands for a member selected from the group consisting of lower alkoxy and cyano, each of the radicals $R_3$, $R_4$ and $R_5$ is a member selected from the group consisting of hydrogen, lower alkyl, trifluoromethyl, lower alkoxy, halogeno, lower alkylmercapto, nitro, amino, and, whenever two of the substituents $R_3$, $R_4$ and $R_5$ are attached to adjacent positions and taken together, lower alkylenedioxy, and $R_6$, attached to one of the positions selected from the group consisting of the 5-position and the 6-position, stands for a member selected from the group consisting of hydrogen and lower alkyl, an acid addition salt thereof, an N-oxide thereof and an acid addition salt of an N-oxide thereof.

2. A compound of the formula:

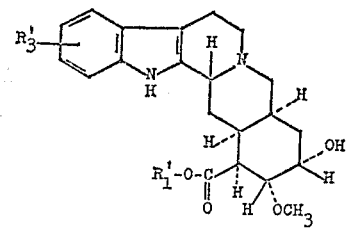

in which $R_1'$ is lower alkyl, and $R_3'$ stands for lower alkoxy.

3. An acid addition salt of a compound of the formula:

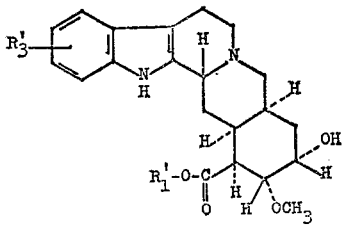

in which $R_1'$ is lower alkyl, and $R_3'$ stands for lower alkoxy.

4. Lower alkyl 18-epi-reserpate.
5. An acid addition salt of lower alkyl 18-epi-reserpate.
6. Methyl 18-epi-reserpate.
7. An acid addition salt of methyl 18-epi-reserpate.
8. Methyl 18-epi-reserpate hydrochloride.
9. Methyl 18-epi-deserpidate.
10. 2-methoxyethyl 18-epi-deserpidate.
11. A member selected from the group consisting of 18-epi-reserpic acid and an acid addition salt thereof.
12. A member selected from the group consisting of 18-epi-deserpidic acid and an acid addition salt thereof.
13. A member selected from the group consisting of a compound of the formula:

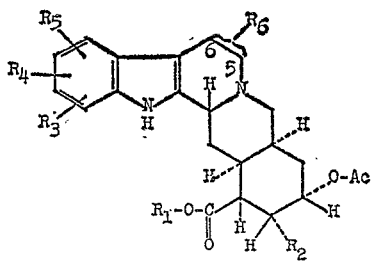

in which $R_1$ is a member selected from the group consisting of lower alkyl phenyl-lower alkyl, lower alkoxy-lower alkyl, in which lower alkyl separates lower alkoxy from the carboxyl group by at least two carbon atoms, and N,N-di-lower alkyl-amino-lower alkyl, in which lower alkyl separates N,N-di-lower alkyl-amino from the carboxyl group by at least two carbon atoms, $R_2$ stands for a member selected from the group consisting of lower alkoxy and cyano, each of the radicals $R_3$, $R_4$ and $R_5$ is a member selected from the group consisting of hydrogen, lower alkyl, trifluoromethyl, lower alkoxy, halogeno, lower alkyl-mercapto, nitro, amino, and, whenever two of the groups $R_3$, $R_4$ and $R_5$ are attached to adjacent positions and taken together, lower alkylenedioxy, and $R_6$, attached to one of the positions selected from the group consisting of the 5-position and the 6-position, stands for a member selected from the group consisting of hydrogen and lower alkyl, and Ac is the acyl portion of an acid selected from the group consisting of lower alkanoic acid, (lower alkoxy)-benzoic acid, lower alkoxy-carbonyloxy-(lower alkoxy)-benzoic acid, lower alkane sulfonic acid, benzene sulfonic acid, (halogeno)-benzene sulfonic acid, (nitro)-benzene sulfonic acid, (cyano)-benzene sulfonic acid and (lower alkyl)-benzene sulfonic acid, an acid addition salt thereof, an N-oxide thereof and an acid addition salt of such N-oxide thereof.

14. A compound of the formula:

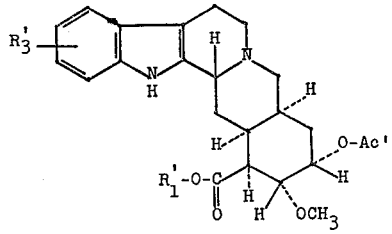

in which $R_1'$ is lower alkyl, $R_3'$ stands for lower alkoxy, and Ac' is the acyl radical of nitrobenzene sulfonic acid.

15. Lower alkyl 18-epi-O-lower alkyl-sulfonyl-reserpate.
16. Lower alkyl 18-epi-O-(halogeno-phenyl-sulfonyl)-reserpate.
17. Methyl 18-epi-O-(4-bromo-phenyl-sulfonyl)-reserpate.
18. Lower alkyl 18-epi-O-(nitro-phenyl-sulfonyl)-reserpate.
19. Methyl 18-epi-O-(3-nitro-phenyl-sulfonyl)-reserpate.
20. Lower alkyl 18-epi-O-(methyl-phenyl-sulfonyl)-reserpate.
21. Methyl 18-epi-O-(4-methyl-phenyl-sulfonyl)-reserpate.

References Cited in the file of this patent
UNITED STATES PATENTS

| | | |
|---|---|---|
| 2,786,844 | MacPhillamy et al. | Mar. 26, 1957 |
| 2,877,225 | Taylor | Mar. 10, 1959 |
| 2,995,556 | Lucas | Aug. 8, 1961 |
| 3,022,311 | Weisenborn et al. | Feb. 20, 1962 |

OTHER REFERENCES

The "Chemical Age" Chem. Dictionary, Benn Ltd., London, 1924, page 89.
Burwell et al.: Jour. Amer. Chem. Soc., vol. 70 (1948), p. 878.
Dudley et al.: Jour. Amer. Chem Soc., vol. 73 (1951), p. 2987.
Burwell: Jour. Amer. Chem. Soc., vol. 74 (1952), pp. 1462–1466.
Groggins: Unit Processes in Org. Chem., McGraw-Hill Co., New York (1952), page 656.
Gould: Mechanism and Structure in Org. Chem., Holt Co., N.Y. (1959), page 345.

UNITED STATES PATENT OFFICE
CERTIFICATE OF CORRECTION

Patent No. 3,126,390                          March 24, 1964

Michael Mullen Robison et al.

It is hereby certified that error appears in the above numbered patent requiring correction and that the said Letters Patent should read as corrected below.

Column 1, line 1, strike out "a"; lines 64 and 65, for "substituted lower alkyl such as for example monocyclic carbocyclic, aryl-lower alkyl," read -- substituted lower alkyl, such as, for example, monocyclic carbocyclic aryl-lower alkyl, --; column 17, line 62, for "deserpidates, e.g. methyl 10-chloro-18-epi deserpidate," read -- deserpidate, --; line 65, for "9,12-dichloror-" read -- 9,12-dichloro- --; column 19, line 23, for "-sulfonyl-" read -- -sulfonyl)- --; column 20, line 68, for "-trimethoxy,benzo-" read -- -trimethoxy-benzo- --; column 22, line 71, for "-vanilloy-reserpate" read -- -vanilloyl)-reserpate --; column 26, line 27, for "16b-carboxyl" read -- 16β-carboxyl --.

Signed and sealed this 8th day of September 1964.

(SEAL)
Attest:

ERNEST W. SWIDER                                EDWARD J. BRENNER
Attesting Officer                                Commissioner of Patents